(12) United States Patent
Takahashi

(10) Patent No.: US 7,793,107 B2
(45) Date of Patent: Sep. 7, 2010

(54) DOCUMENT VERIFICATION APPARATUS AND CONTROL METHOD THEREOF

(75) Inventor: Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 11/861,649

(22) Filed: Sep. 26, 2007

(65) Prior Publication Data

US 2008/0086642 A1 Apr. 10, 2008

(30) Foreign Application Priority Data

Oct. 6, 2006 (JP) ............................. 2006-275728

(51) Int. Cl.
*H04L 9/32* (2006.01)
(52) U.S. Cl. .................................... 713/176
(58) Field of Classification Search ........................ None
See application file for complete search history.

(56) References Cited

U.S. PATENT DOCUMENTS

| 6,161,183 | A * | 12/2000 | Saito et al. .................. 713/176 |
| 2002/0186241 | A1* | 12/2002 | Kohda et al. ................ 345/744 |
| 2003/0159048 | A1* | 8/2003 | Matsumoto et al. ......... 713/178 |
| 2005/0235140 | A1* | 10/2005 | Hui et al. .................... 713/156 |

FOREIGN PATENT DOCUMENTS

| JP | 2002-091304 A | 3/2002 |
| JP | 2006-260017 A | 9/2006 |

OTHER PUBLICATIONS

The above references were cited in a Jul. 28, 2008 Japanese Office Action issued in the counterpart Japanese Patent Application 2006-275728.

* cited by examiner

*Primary Examiner*—Nasser Moazzami
*Assistant Examiner*—Michael S McNally
(74) *Attorney, Agent, or Firm*—Cowan, Liebowitz & Latman, P.C.

(57) ABSTRACT

This invention shortens a time required for batch verification of a plurality of digital documents. To this end, whether or not an electronic signature in a long-term signature format is added to a digital document is checked. A first verification process is applied to a digital document which is determined to have an electronic signature in the long-term signature format added to it. A second verification process, which requires a shorter processing time than the first verification process, is applied to a digital document which is determined not to have an electronic signature in the long-term signature format added to it.

2 Claims, 33 Drawing Sheets

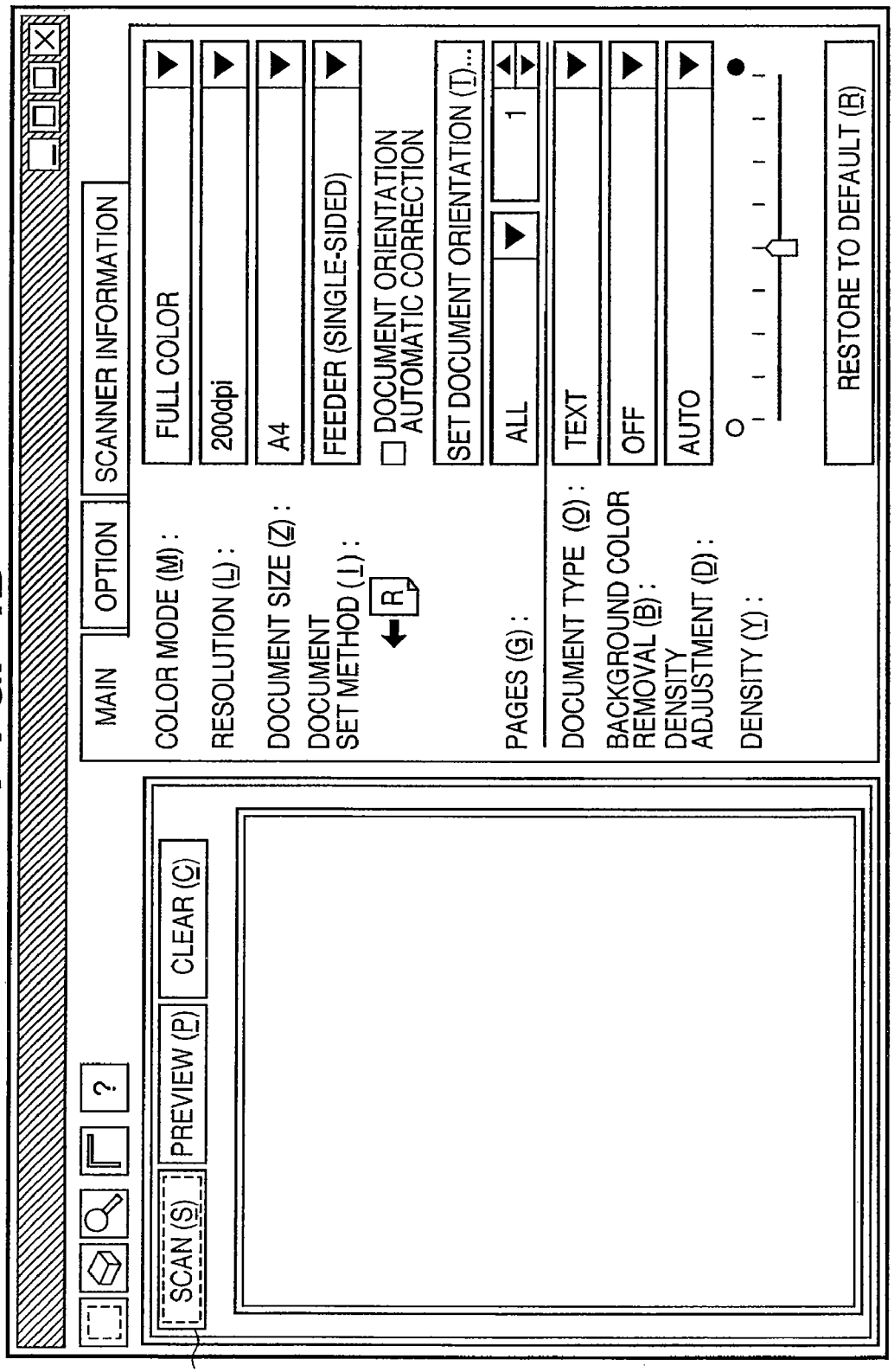

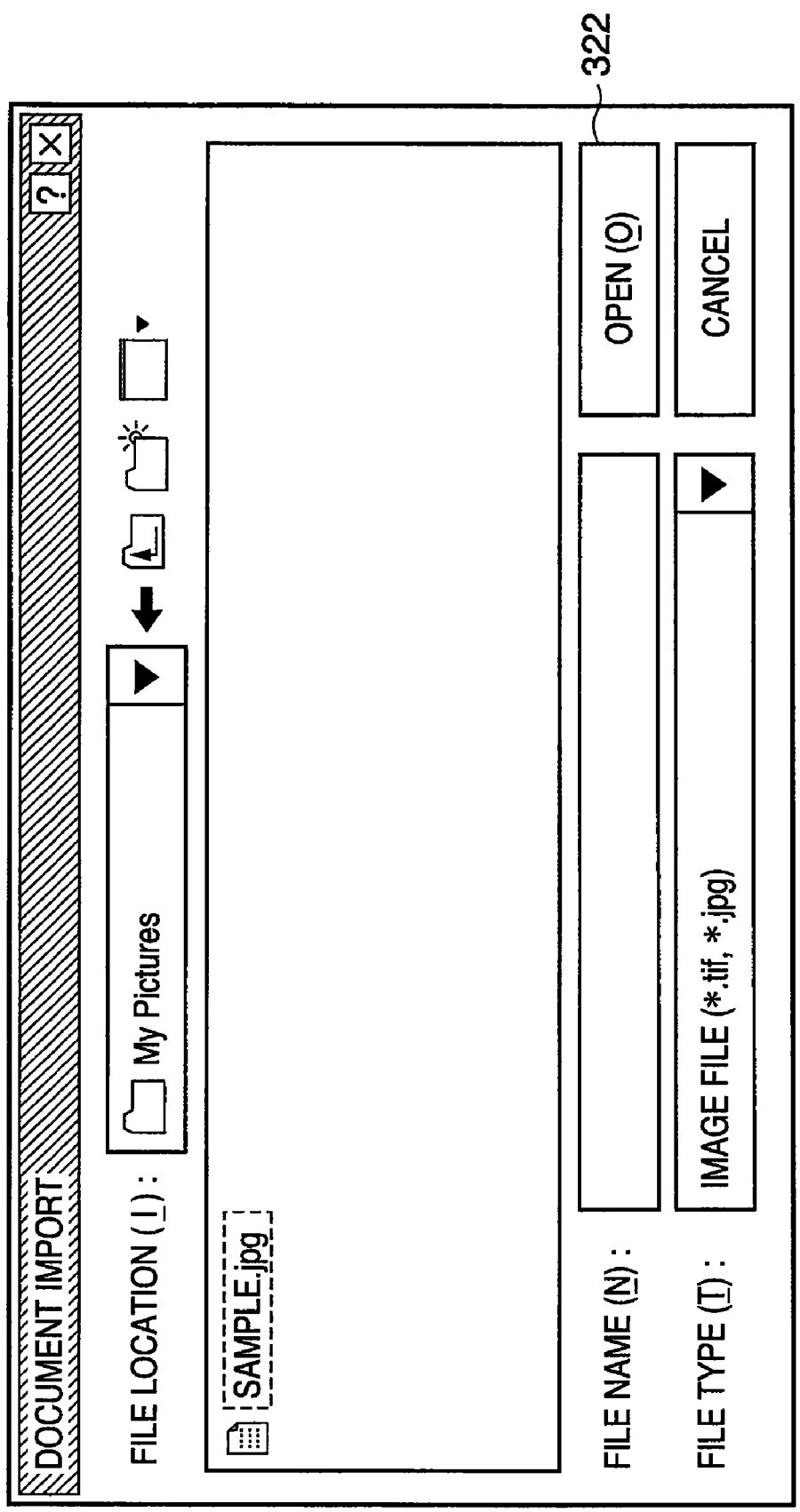

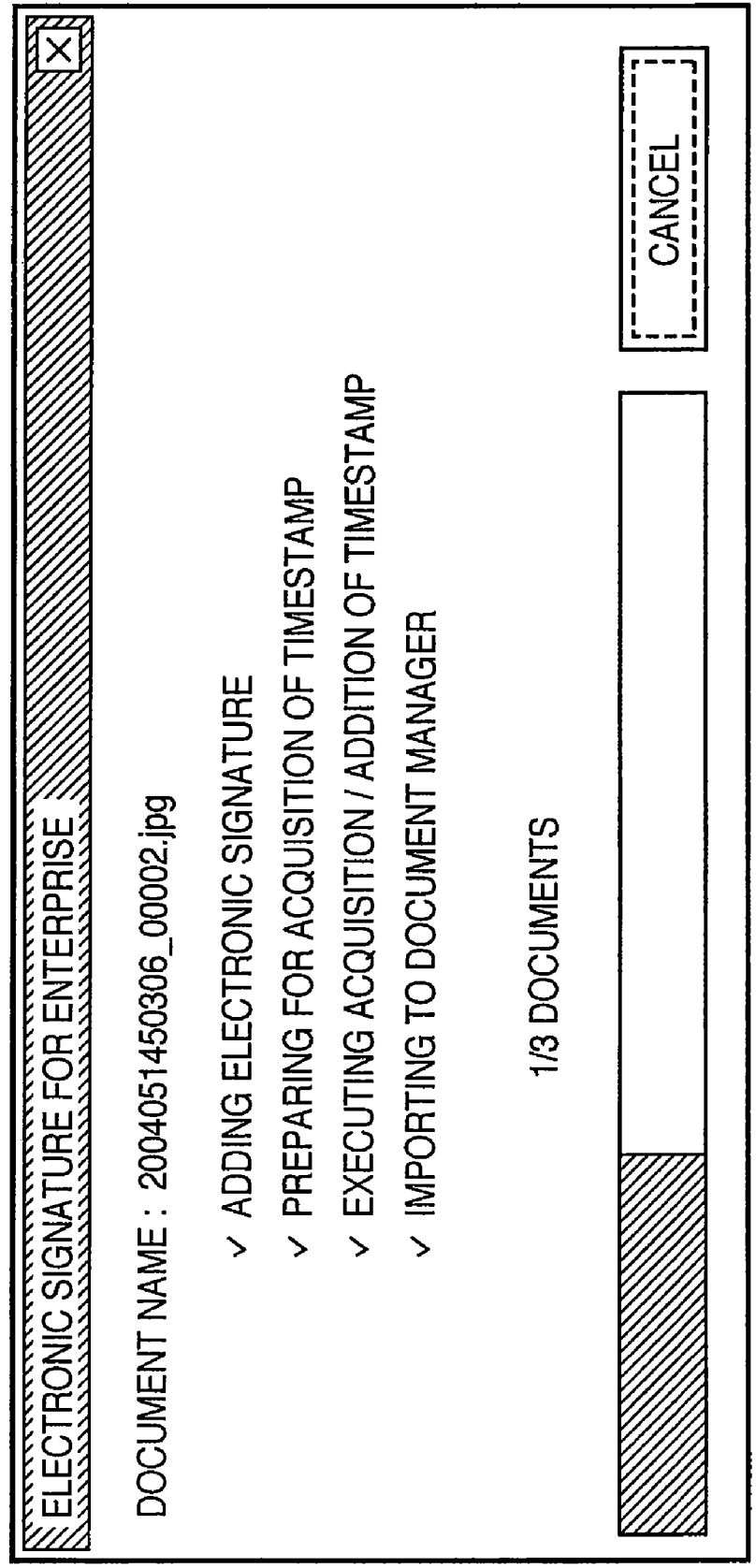

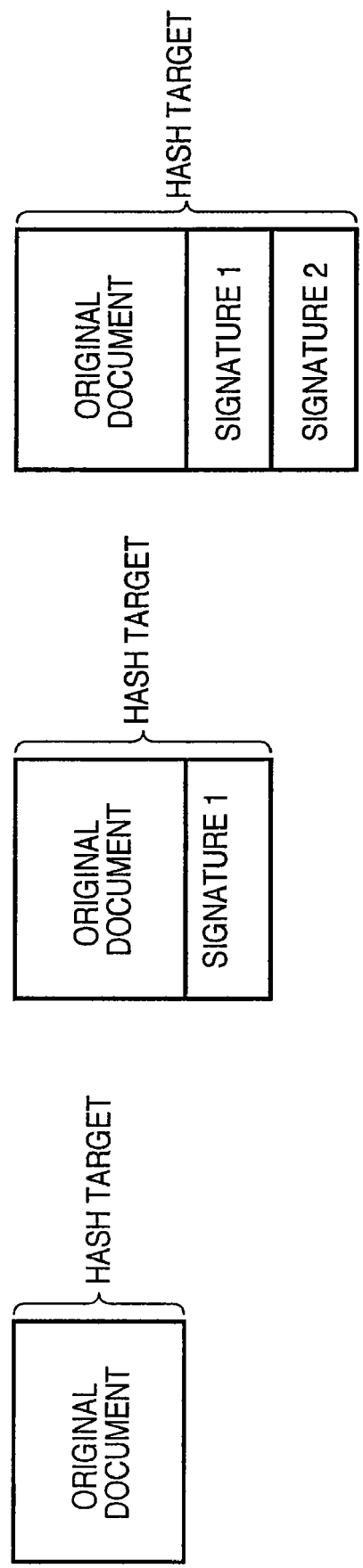

FIG. 9B

| VERIFICATION | ? | X |

SEARCH LOCATION: [XXXXXXXXXXXX ▼] [BROWSE...]

- SYSTEM INDEX
  - DOCUMENT NAME
    - [MATCH FULL ▼] [_____▼]
  - CLASS 1 [_____▼]
  - CLASS 2 [_____▼]
  - CLASS 3 [_____▼]
- USER INDEX
  - GROUP NAME / INDEX NAME
    - [MATCH FULL ▼] [____▼]🗓 ~ ▨▨▨▨🗓
  - GROUP NAME / INDEX NAME
    - [RANGE DESIGNATION ▼] [____▼]🗓 ~ [____▼]🗓
  - GROUP NAME / INDEX NAME
    - [MATCH PARTIAL ▼] [_____▼]
  - GROUP NAME / INDEX NAME
    - [MATCH PARTIAL ▼] [_____▼]
  - GROUP NAME / INDEX NAME
    - [MATCH FULL ▼] [_____▼]
  - GROUP NAME / INDEX NAME

[SET] [CLEAR ALL]

[SEARCH] [CLOSE]
  502      503

FIG. 9C

Document Manager

SEARCH RESULT  0 – 10TH DOCUMENTS

| DOCUMENT NAME | ALTERATION | SIGNATURE | EXPIRATION DATE | GUARANTEE PERIOD | CLASS |
|---|---|---|---|---|---|
| XXXX | -- | -- | XXXX/XX/XX XX:XX | XXXX/XX/XX XX:XX | |
| XXXXXXX | -- | -- | XXXX/XX/XX XX:XX | -- | |
| XXXXXXXXXX | -- | -- | XXXX/XX/XX XX:XX | XXXX/XX/XX XX:XX | |
| XXXXX | -- | -- | XXXX/XX/XX XX:XX | -- | |
| XXXXXXXXXXXXXXXX | -- | -- | XXXX/XX/XX XX:XX | XXXX/XX/XX XX:XX | |

VERIFY 504    CLOSE 505

506

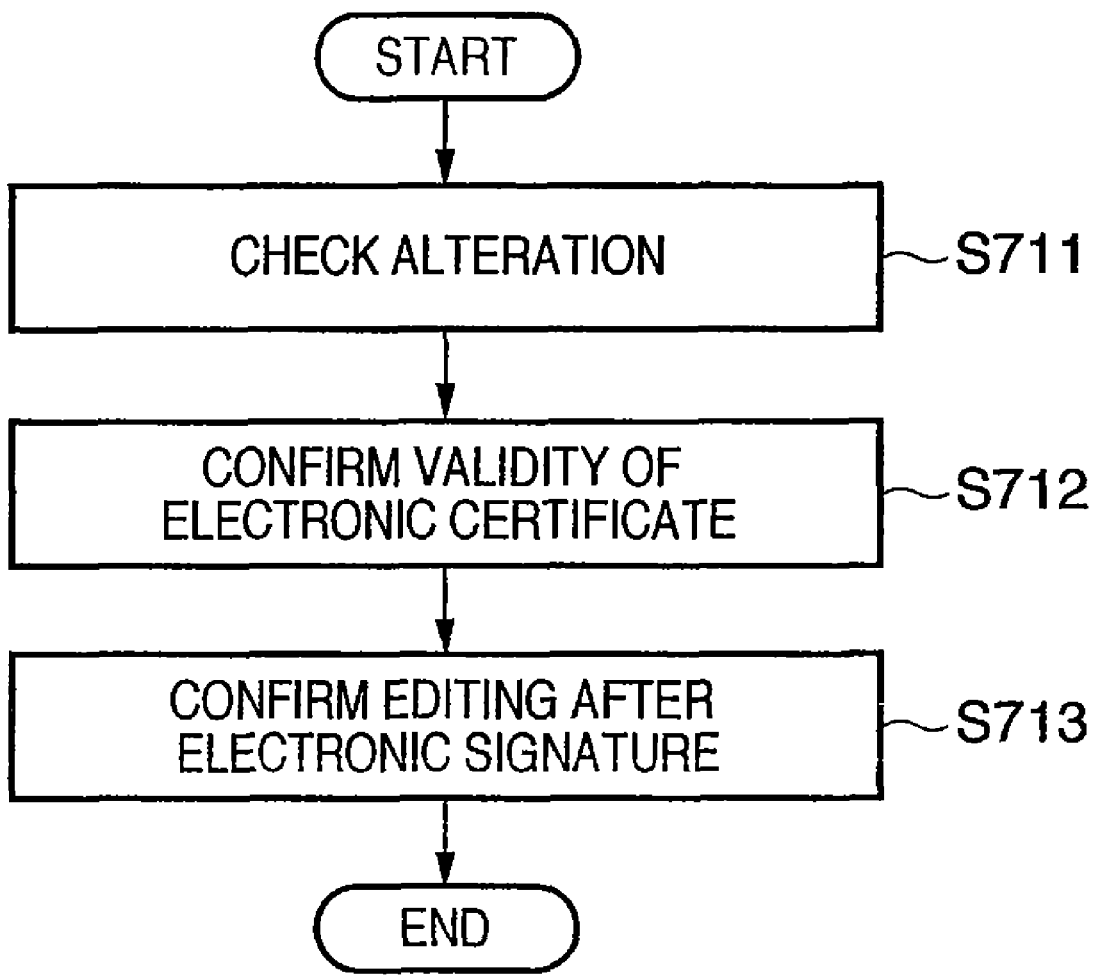

FIG. 12

VERIFICATION RESULT

| DOCUMENT NAME | LONG-TERM SIGNATURE | VERIFICATION RESULT | RESULT CONTENTS | TIMESTAMP DATE AND TIME | TIMESTAMP VALID... | LAST VERIFICATION DATE AND TIME | SIZE |
|---|---|---|---|---|---|---|---|
| TIMESTAMP | — | ✓ | DOCUMENT HAS NOT BEEN ALTERED | 2006/02/09 18:20:47 | 2015/06/10 06:12:38 | 2006/03/22 10:08:02 | 115KB |
| PATTERN F-L-1 | — | ⚠ | DOCUMENT HAS BEEN ALTERED | 2006/02/16 10:21:22 | 2015/06/10 06:15:22 | 2006/03/22 10:08:03 | 254KB |
| USER | — | ✓ | DOCUMENT HAS NOT BEEN ALTERED | N/A | N/A | 2006/03/22 10:08:04 | 109KB |
| USER +TIME STAMP | — | ! | INVALID CERTIFICATE OR EDITING AFTER SIGNATURE | 2006/02/16 10:22:26 | 2015/06/10 06:12:38 | 2006/03/22 10:08:05 | 118KB |
| TIME STAMP | — | ✓ | DOCUMENT HAS NOT BEEN ALTERED | N/A | N/A | 2006/03/22 10:08:06 | 107KB |
| TIME STAMP +TIME STAMP | — | ? | | N/A | N/A | 1899/12/20 00:00:00 | 116KB |
| TIME STAMP +USER | — | ! | INVALID CERTIFICATE OR EDITING AFTER SIGNATURE | N/A | N/A | 2006/03/22 10:08:07 | 110KB |
| TIME STAMP +USER+TIME... | — | ! | INVALID CERTIFICATE OR EDITING AFTER SIGNATURE | 2006/02/06 10:24:46 | 2015/06/10 06:15:22 | 2006/03/22 10:08:08 | 119KB |
| TIME STAMP +USER+TIME... | — | ? | | N/A | N/A | 1899/12/30 00:00:00 | 117KB |

CLOSE

FIG. 13A

| DOCUMENT ID | DOCUMENT NAME | VERIFICATION RESULT | VERIFICATION DATE AND TIME |
|---|---|---|---|
| 1 | Document A | VALID | 09:01:08 |
| 2 | Document B | VALID | 09:01:10 |
| 3 | Document C | INVALID | 09:01:14 |

FIG. 13B

| DOCUMENT ID | INDEX NAME | TYPE |
|---|---|---|
| 1 | Company Name | String |
| 2 | Payment | Int |
| 3 | Input Device | String |

FIG. 13C

| DOCUMENT ID | INDEX ID | VALUE |
|---|---|---|
| 1 | 1 | AA TRADE CORPORATION |
| 1 | 3 | Scanner 1 |
| 2 | 1 | CC INDUSTRIES |
| 2 | 3 | MFP 2 |
| 3 | 1 | BB CORPORATION |
| 3 | 3 | MFP 1 |

FIG. 13D

| DOCUMENT ID | INDEX ID | VALUE |
|---|---|---|
| 1 | 2 | 15,000 |
| 2 | 2 | 210 |
| 3 | 2 | 25,000 |

F I G. 14A
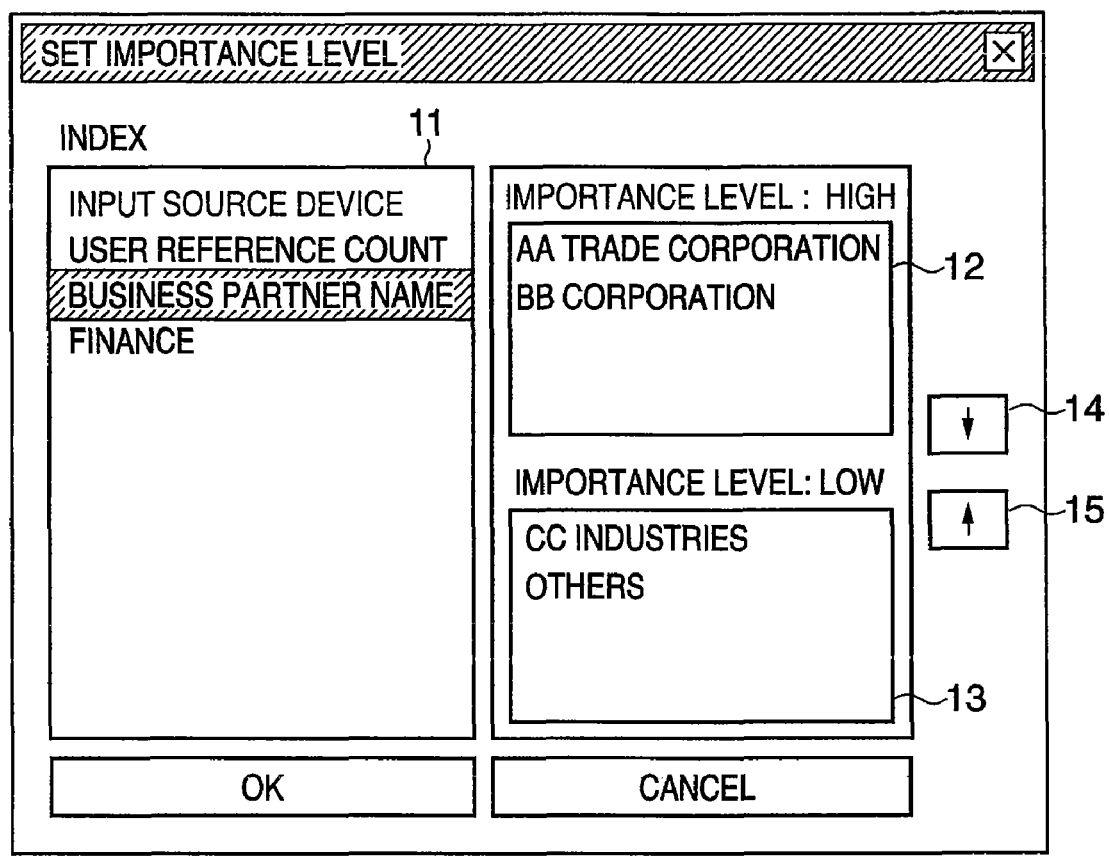

DOCUMENT VERIFICATION APPARATUS AND CONTROL METHOD THEREOF

BACKGROUND OF THE INVENTION

1. Field of the Invention

The present invention relates to verification of digital documents.

2. Description of the Related Art

A document management system stores digital data created by a word processor or the like and those obtained by scanning documents printed on paper sheets (these digital data will be referred to as "digital documents" hereinafter). Then, the system adds electronic signatures and digital timestamps to these digital documents to implement certification of creators and the like, confirmation of non-alteration, and existence proof of the digital documents.

Note that all digital timestamps will also be referred to as electronic signatures hereinafter since they are a kind of electronic signature. Therefore, "add an electronic signature" includes cases of adding an electronic signature, adding a digital timestamp, and adding both an electronic signature and digital timestamp. Also, certification of creators and the like, confirmation of non-alteration, and existence proof of digital documents will all be referred to as "verification" hereinafter. Also, electronic signatures include digital signatures.

Under such circumstance, the application of a technique for executing batch verification of electronic signatures of a plurality of digital documents added with electronic signatures has begun. Since digital documents added with electronic signatures are increasing, a document management system having a function of executing batch verification of electronic signatures of large quantities of digital documents is in demand.

Verification of electronic signatures is a process that requires a relatively long time. In particular, a digital document, the term of an electronic signature of which has been extended many times, includes a plurality of electronic signatures. In such case, a time proportional to the number of electronic signatures is required until the verification result of that digital document is obtained. On the other hand, the technique that executes batch verification of digital documents executes identical verification processes even for digital documents which are not so important. Therefore, if there are large quantities of digital documents including a large number of electronic signatures, a long verification time is required.

Also, a document verification scheduler, which periodically verifies electronic signatures addedadded to digital documents and stores the verification results in a database in accordance with a schedule set by the user, has been proposed. With the document verification scheduler, the user determines the importance levels of digital documents to be verified, and inputs the determination results to the document verification scheduler. The scheduler verifies digital documents with lower importance levels infrequently, and verifies digital documents with higher importance levels frequently.

However, the document verification scheduler merely executes verification according to the schedule, and the verification results stored in the database by the document verification scheduler do not strictly indicate the validity of digital documents at the time of confirmation of the verification results by the user. Put differently, the document verification scheduler cannot cope with a situation in which the user wants to verify the validity of digital documents at the present moment.

SUMMARY OF THE INVENTION

In one aspect, an apparatus for verifying a digital document, comprises: a determiner, arranged to determine whether or not an electronic signature in a long-term signature format is added to a digital document; a first verification section, arranged to apply a first verification process to a digital document which is determined by the determiner as a digital document to which the electronic signature in the long-term signature format is added; and a second verification section, arranged to apply a second verification process, which requires a shorter processing time than the first verification process, to a digital document which is determined by the determiner as a digital document to which the electronic signature in the long-term signature format is not added.

In another aspect, a method of controlling an apparatus which verifies a digital document, the method comprises the steps of: determining an importance level of a digital document; executing a first verification process in association with a reliability of the digital document which is determined in the determining step to have a high importance level; and executing a second verification process, which is simpler than the first verification process, in association with a reliability of the document which is determined in the determining step not to have a high importance level.

According to these aspects, upon execution of batch verification of a plurality of digital documents, a verification method is switched for each digital document. Therefore, the verification time for digital documents with lower importance levels is saved, and prompt verification (verification at the present moment) of digital documents added with electronic signatures in a long-term signature format and important digital documents is allowed, thus shortening the time required for batch verification.

Further features of the present invention will become apparent from the following description of exemplary embodiments with reference to the attached drawings.

BRIEF DESCRIPTION OF THE DRAWINGS

FIG. 4B shows an example of a scan dialog in the registration process of a digital document;

FIG. 4F shows an example of a file selection dialog in the registration process of a digital document;

FIG. 4G shows an example of a processing state display dialog in the registration process of a digital document;

FIGS. 7A to 7C show the relationships between an original digital document and Hash value calculation target;

FIG. 9B shows an example of a search condition setting dialog in the verification process of a digital document;

FIG. 9C shows an example of a search result dialog in the verification process of a digital document;

FIG. 10C is a flowchart showing details of the verification process of an n-th electronic signature;

FIG. 12 shows details of the verification result dialog shown in FIG. 9C;

FIGS. 13A to 13D show an example of a data structure managed by the document management server;

FIGS. 14A and 14B show an example of a user interface (UI) used to set an importance.

DESCRIPTION OF THE EMBODIMENTS

Information processes according to embodiments of the present invention will be described in detail hereinafter with reference to the accompanying drawings.

First Embodiment

[Arrangement of Document Management System]

Figure 1:
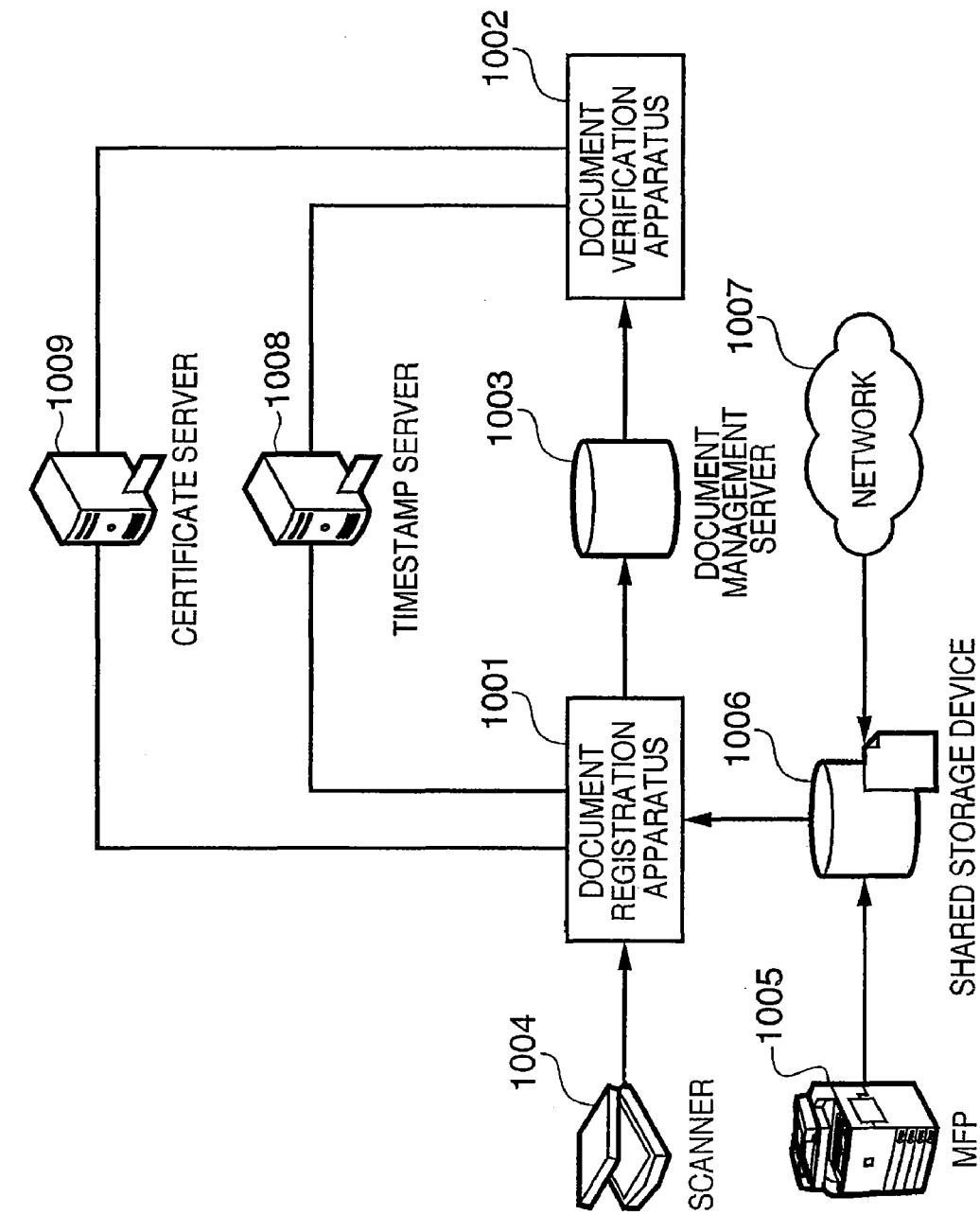
FIG. 1 is a block diagram showing the arrangement of a document management system according to the first embodiment.

FIG. 1 shows the arrangement of a document management system according to the first embodiment.

A document management server 1003 has a function of storing various digital documents as data files and searching stored digital documents for a digital document that the user wants.

A document registration apparatus 1001 generates a new digital document obtained by adding an electronic signature to a digital document, transmits the new digital document to the document management server 1003, and controls the document management server 1003 to store that document. An action that the document registration apparatus 1001 takes to control the document management server 1003 so as to store a digital document will be referred to as "registering a digital document" hereinafter.

The document registration apparatus 1001 has a function of controlling a scanner 1004 to acquire a digital document as digital data of, e.g., a JPEG format. The document registration apparatus 1001 can also acquire a digital document stored in a shared storage device 1006. The shared storage device 1006 stores a digital document which is attached to an e-mail message received from a network 1007 such as the Internet or the like, and a digital document which is scanned by a multi-functional peripheral equipment (MFP) 1005 and is sent by a send function of the MFP 1005. The digital documents stored in the shared storage device 1006 include both those to which no electronic signatures are added, and those to which electronic signatures have already been added by other apparatuses.

A document verification apparatus 1002 reads out a digital document stored in the document management server 1003, and verifies an electronic signature added to the readout digital document. The document verification apparatus 1002 has a document verification scheduler function of periodically verifying electronic signatures added to digital documents according to a schedule set by the user. Note that details of the verification process will be described later. Furthermore, the document verification apparatus 1002 provides a user interface (UI) which allows the user to select an index of importance, and to set a threshold upon determination of the importance. Note that various settings of the importance and its UI will be described later.

Each of the document management server 1003, document registration apparatus 1001, and document verification apparatus 1002 comprises a CPU and memory (not shown), and implements the functions associated with the document management system when the CPU executes programs stored in the memory. Digital documents are stored in a storage device such as a hard disk or the like under the control of the document management server 1003. FIG. 1 shows an example in which the document registration apparatus 1001 and document verification apparatus 1002 are independent apparatuses, but a single apparatus having both the functions of the two apparatuses may be used.

[Registration of Digital Document]

Figure 3A:
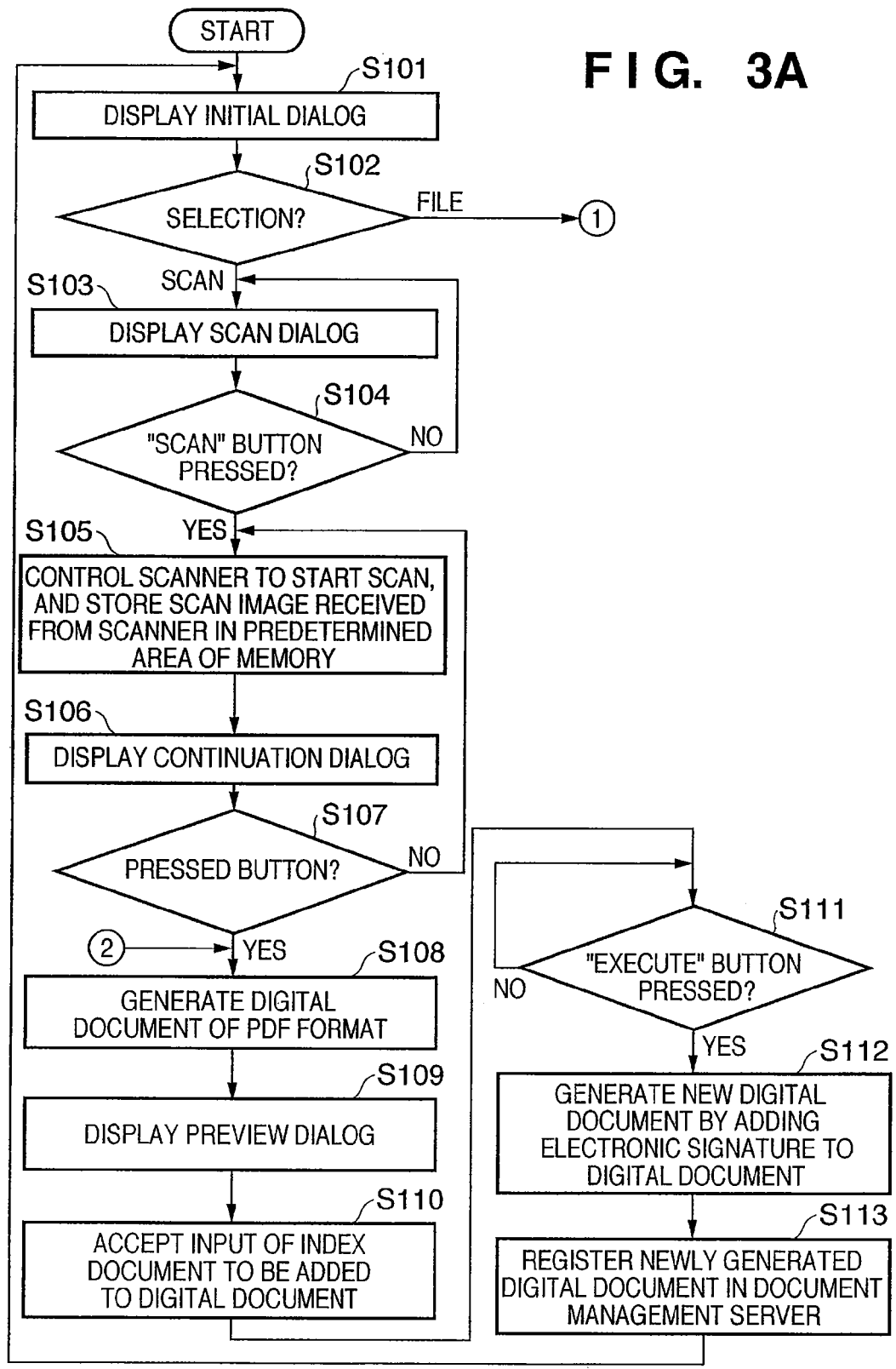
FIGS. 3A and 3B are flowcharts for explaining a process executed when a document registration apparatus acquires a digital document, and registers it in the document management server.
Figure 3B:
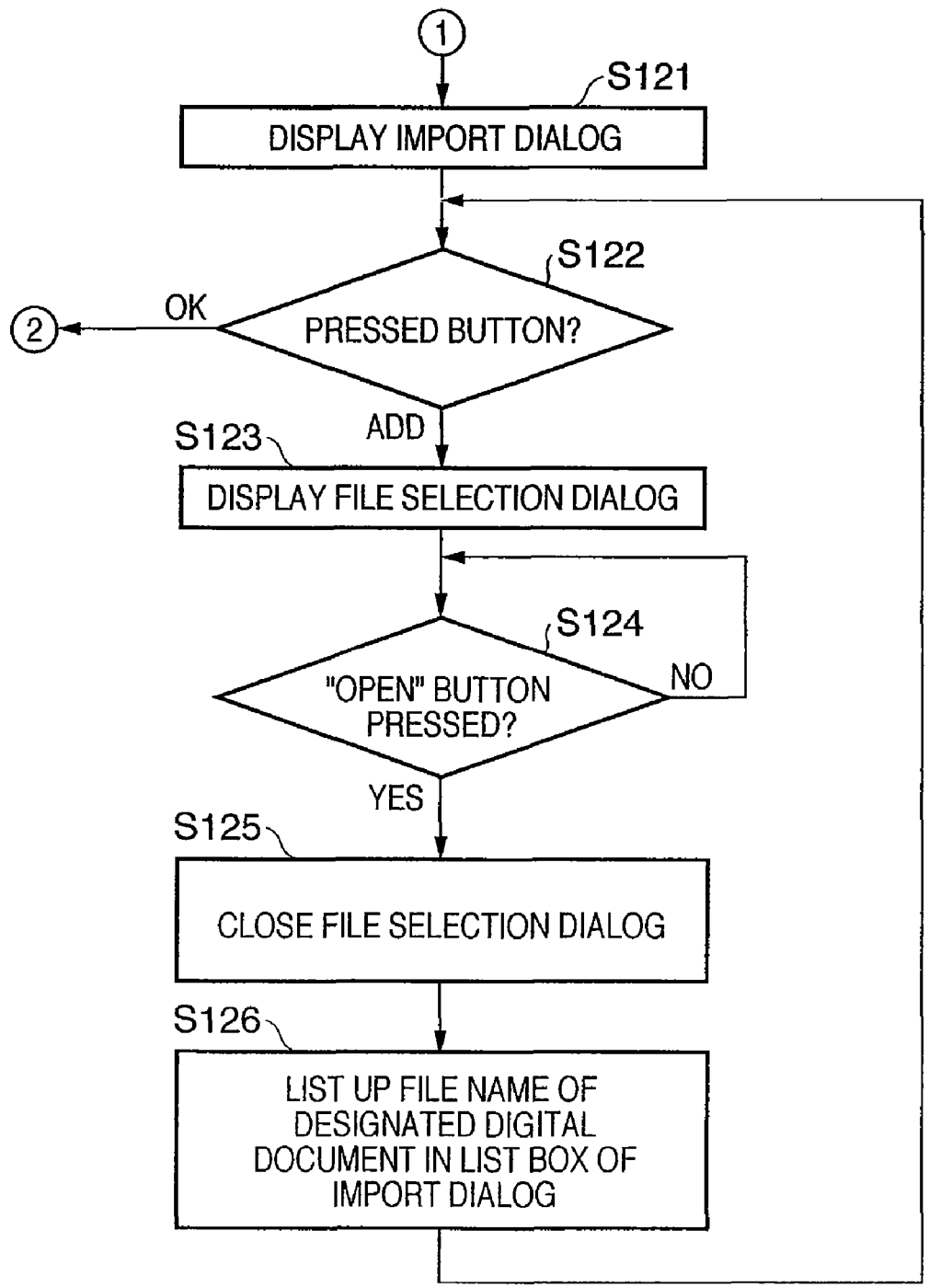

FIGS. 3A and 3B are flowcharts for explaining the process executed when the document registration apparatus 1001 acquires a digital document and registers it in the document management server 1003.

Figure 4A:
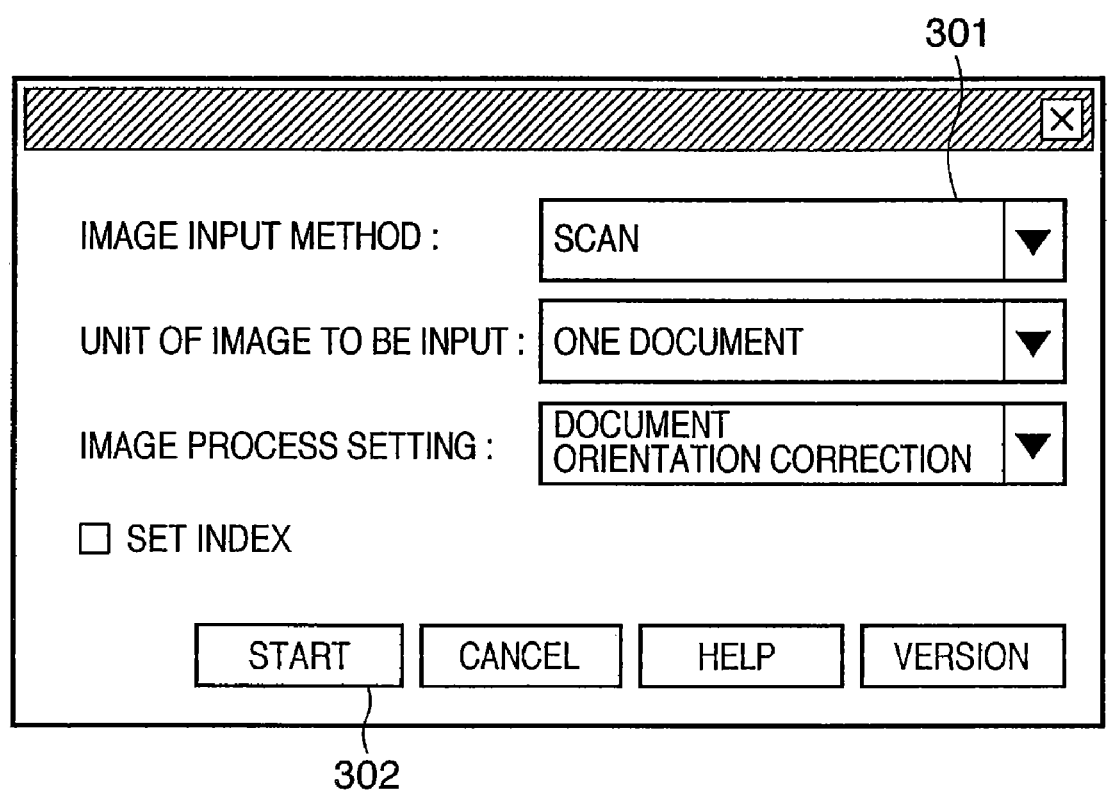
FIG. 4A shows an example of an initial dialog in the registration process of a digital document.

The document registration apparatus 1001 displays an initial dialog shown in FIG. 4A on a monitor (not shown) (S101) The user selects "SCAN" or "FILE" from a drop-down menu of a text box 301 on the dialog using input devices such as a keyboard, mouse, and the like (not shown) connected to the document registration apparatus 1001. If the user selects "SCAN" and then presses a "start" button 302 on the initial dialog (S102), the document registration apparatus 1001 displays a scan dialog shown in FIG. 4B, which is used to make various settings upon scanning (S103).

Figure 4C:
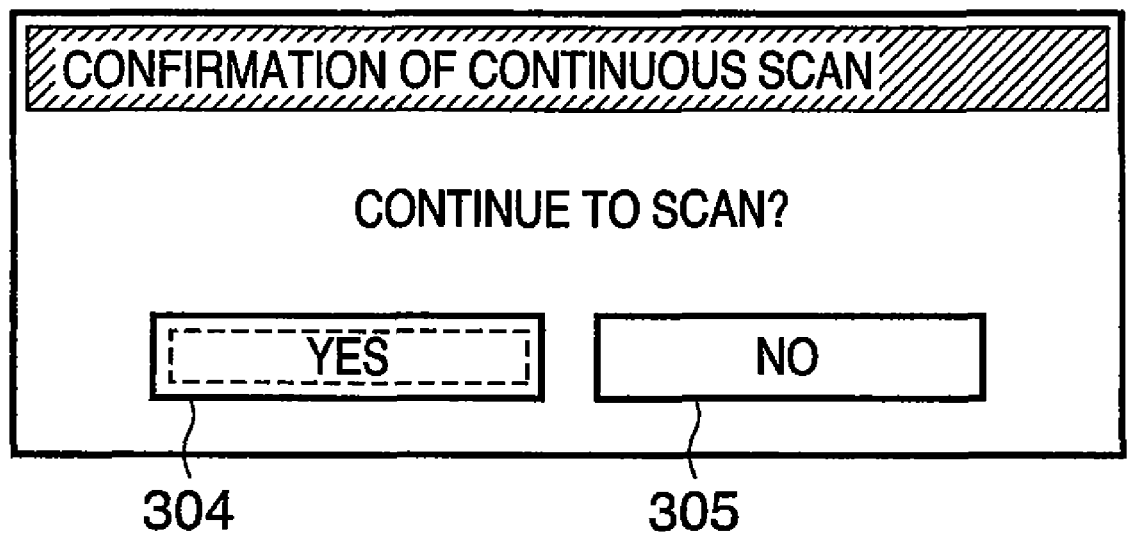
FIG. 4C shows an example of a continuation dialog in the registration process of a digital document.

The user manipulates the scan dialog to set a color mode, resolution, and the like, and then presses a "scan" button 303 on the scan dialog (S104). In response to this operation, the document registration apparatus 1001 controls the scanner 1004 to start a scan, and temporarily stores a scan image received from the scanner 1004 in a predetermined area of the memory in the apparatus 1001 (S105). Then, the document registration apparatus 1001 displays a continuation dialog shown in FIG. 4C, which prompts the user to select whether or not to continue a scan (S106).

If the user presses a "YES" button 304 on the continuation dialog (S107), the document registration apparatus 1001 returns the process to step S105 to display the scan dialog. On the other hand, if the user presses a "NO" button 305 on the continuation dialog (S107), the document registration apparatus 1001 generates a digital document of, e.g., a PDF (Portable Document Format) format from the scan image stored in the predetermined area of the memory in the apparatus 1001, and stores it in a predetermined area of the memory (S108).

Figure 4D:
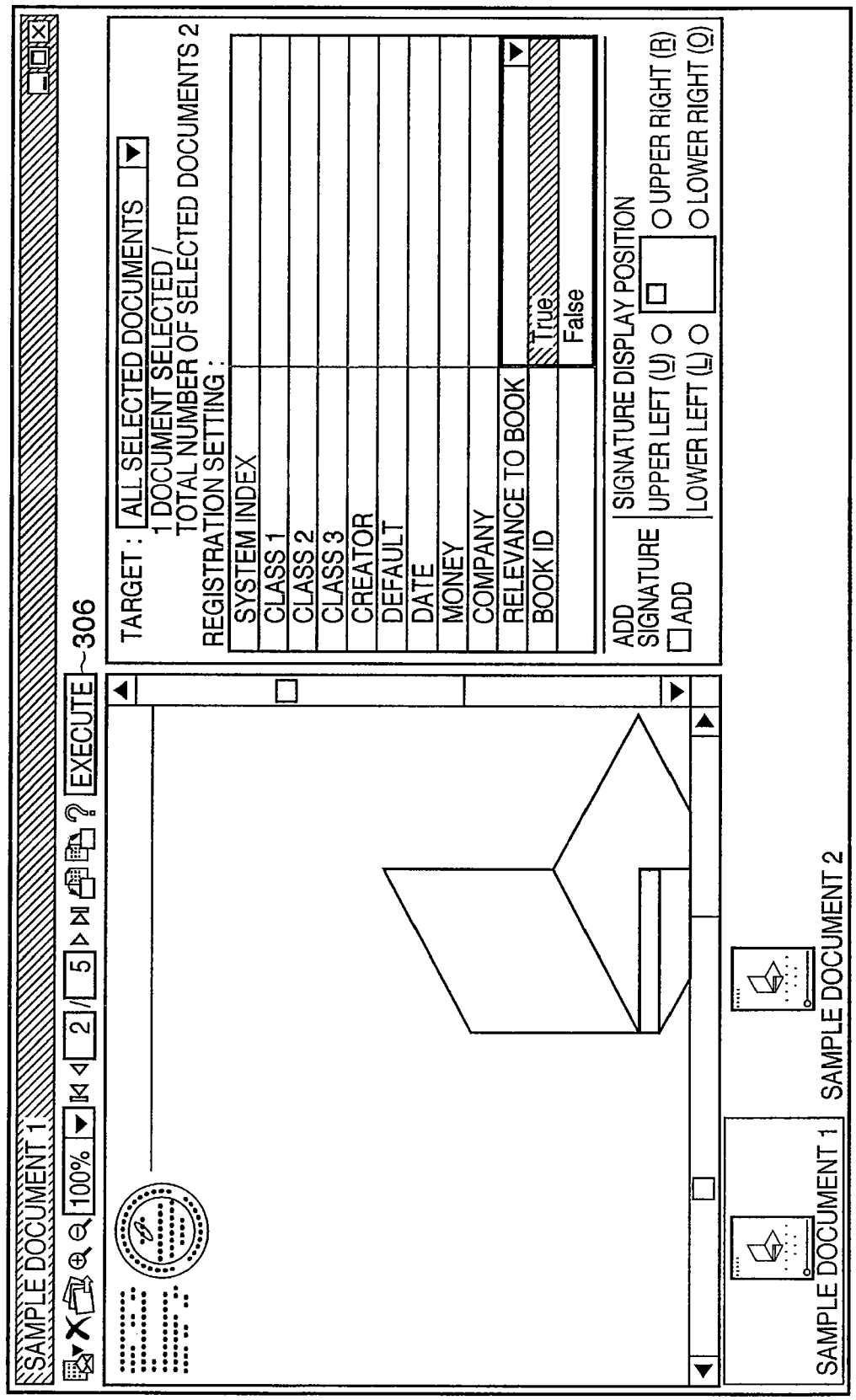
FIG. 4D shows an example of a preview dialog in the registration process of a digital document.
Figure 4E:
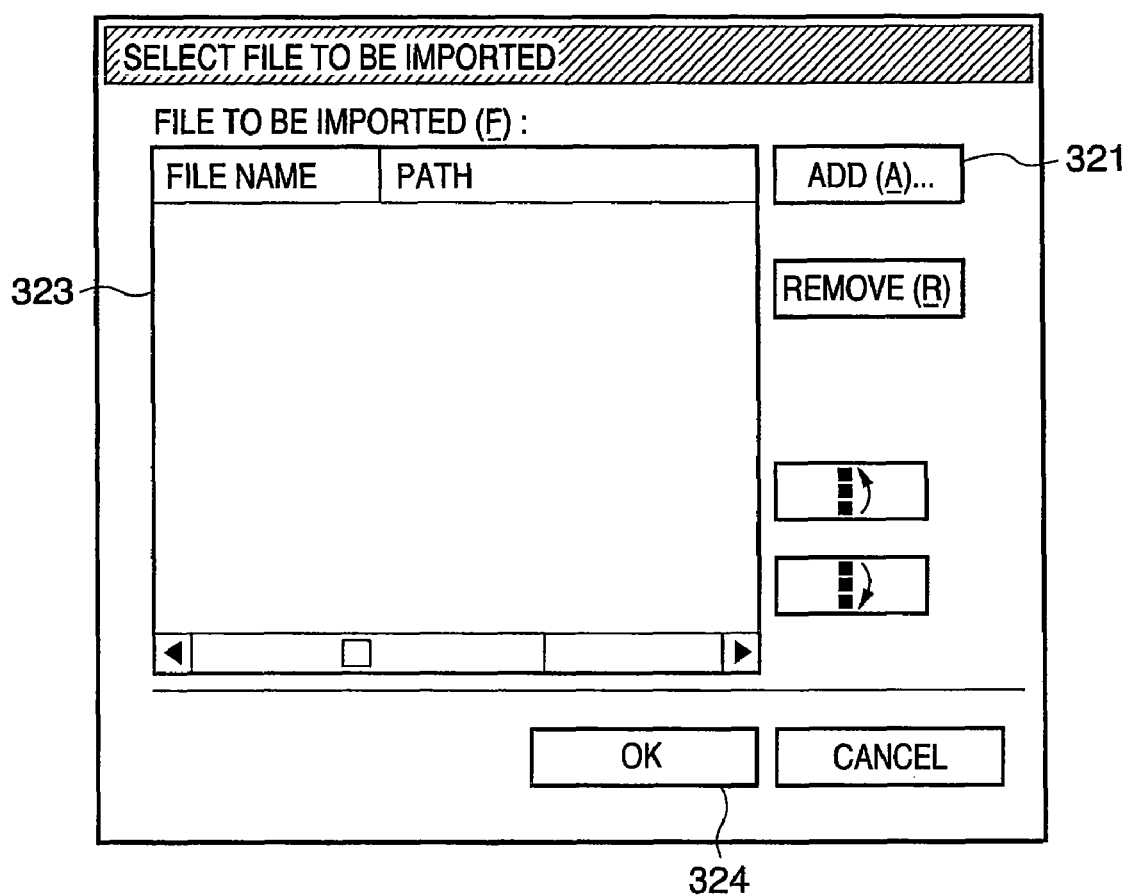
FIG. 4E shows an example of an import dialog in the registration process of a digital document.

If the user selects "FILE" and then presses the "start" button 302 on the initial dialog (S102), the document registration apparatus 1001 displays an import dialog shown in FIG. 4E, which allows the user to designate a digital document to be input (S121). If the user presses an "add" button 321 on the import dialog (S122), the document registration apparatus 1001 displays a file selection dialog shown in FIG. 4F, which allows the user to select a digital document (S123). The user manipulates the file selection dialog to designate the file name of a digital document, and then presses an "open" button 322 on the file selection dialog (S124). In response to this operation, the document registration apparatus 1001 closes the file selection dialog (S125), lists up the designated file name of the digital document on a list box 323 of the import dialog (S126), and returns the process to step S122.

If the user presses an "OK" button 324 on the import dialog (S122), the document registration apparatus 1001 advances the process to step S108. The document registration apparatus 1001 sequentially loads the digital documents listed in the list box 323 from the shared storage device 1006, converts them into digital documents of the PDF format, and stores the converted digital documents in a predetermined area of the memory (S108).

Upon completion of generation of the digital document (S108), the document registration apparatus 1001 displays a preview dialog shown in FIG. 4D (S109).

The preview dialog is used to display a preview of a digital document of the PDF format. The user inputs index information to be added to a digital document and the like using the preview dialog, and the document registration apparatus 1001 accepts this input (S110). Furthermore, in step S110 the user selects if an electronic signature is to be added to a normal format or long-term signature format, and the document registration apparatus 1001 accepts this selection.

Upon completion of input of index information, selection of the adding format, and the like, the document registration apparatus 1001 checks if the user presses an "execute" button 306 on the preview dialog (S111). Then, the document registration apparatus 1001 generates a new digital document by adding an electronic signature, the input index information, and a digital timestamp to the digital document in the selected adding format (S112). The document registration apparatus 1001 registers the newly generated digital document in the document management server 1003 (S113), and returns the process to step S101. Note that the document registration apparatus 1001 displays a processing state display dialog shown in FIG. 4G, which shows the current processing state, while it registers digital documents in the document management server 1003, and closes the processing state display dialog upon completion of registration of all digital documents.

Registration Process

Figure 5:
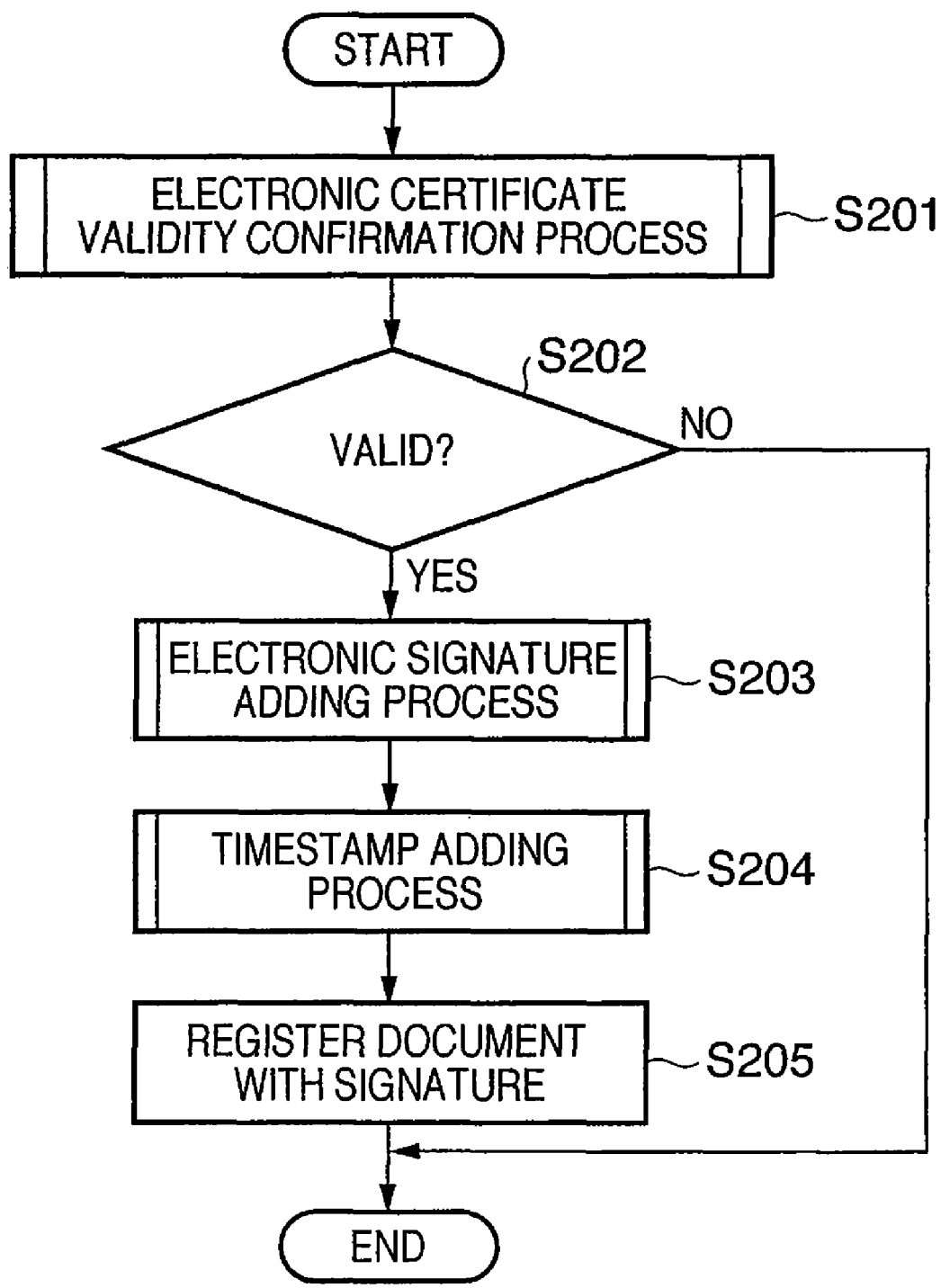
FIG. 5 is a flowchart showing a process executed when the document registration apparatus appends an electronic signature to a digital document, and registers the digital document in the document management server.

FIG. 5 is a flowchart showing the process (steps S112 and S113 in FIGS. 3A and 3B) executed when the document registration apparatus 1001 appends an electronic signature to a digital document and registers that digital document in the document management server 1003.

Assume that the memory of the document registration apparatus 1001 stores a Hash function, private key, and electronic certificate corresponding to the private key in advance prior to execution of the process shown in FIG. 5. The electronic certificate includes a public key, which describes information such as the serial number of the electronic certificate, information indicating the publisher (server) of the electronic certificate, information associated with a private key holder (the name or the like of the private key holder), the expiration date of the electronic certificate, and the like.

The document registration apparatus 1001 confirms the validity of an electronic certificate (to be referred to as a "target certificate" hereinafter) to be used in an electronic signature (S201), and checks if the target certificate is valid (S202). If the target certificate is valid, the document registration apparatus 1001 advances the process to step S203; otherwise, the document registration apparatus 1001 ends the process. Details of the validity confirmation process of the target certificate will be described later.

Next, the document registration apparatus 1001 generates a new digital document by adding an electronic signature to the digital document using the target certificate whose validity has been confirmed (S203). Note that details of the electronic signature adding process will be described later.

The document registration apparatus 1001 then generates a still new digital document by adding a digital timestamp to the digital document added with the electronic signature (S204). Note that details of the digital timestamp adding process will be described later.

The document registration apparatus 1001 registers the digital document added with the electronic signature and digital timestamp in the document management server 1003 (S205), thus ending the process.

In the above description, a new digital document is generated by adding an electronic signature and digital timestamp to the digital document. However, a new digital document need not always be generated. For example, a digital document before an electronic signature is added, the electronic signature, and a digital timestamp may be registered as independent files in the document management server 1003 in association with each other. If the document registration apparatus 1001 has failed the process such as adding of the electronic signature, that of the digital timestamp, registration of the digital document, or the like, it executes an appropriate error process.

Validity Confirmation Process of Electronic Certificate

Figure 6A:
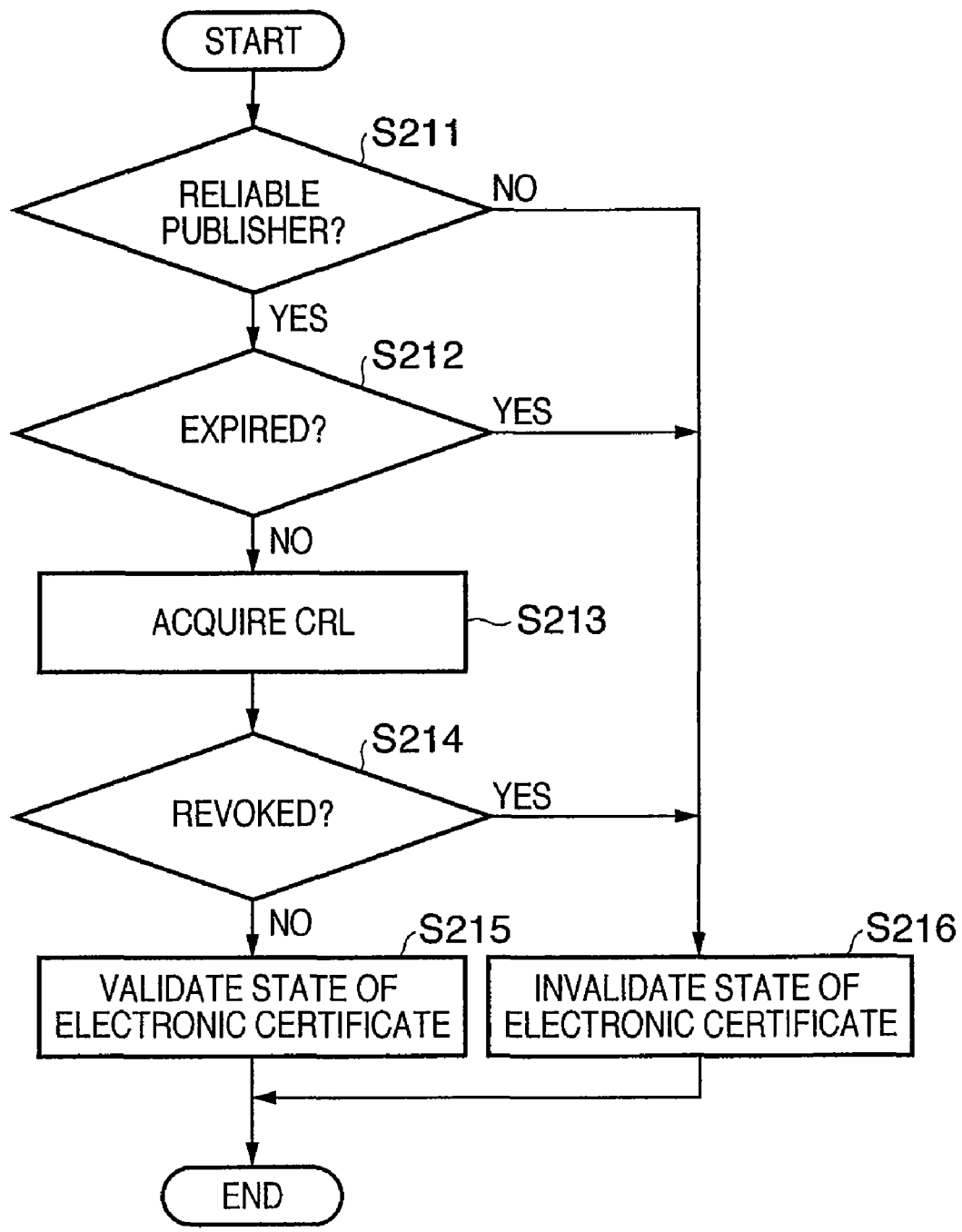
FIG. 6A is a flowchart showing details of a validity confirmation process of a certificate.

FIG. 6A is a flowchart showing details of the confirmation process (step S201 in FIG. 5) of the validity of the electronic certificate.

The document registration apparatus 1001 acquires the information of the publisher of the target certificate, and checks if the publisher is a reliable server (certificate authority) (S211). If the document registration apparatus 1001 determines that the publisher is reliable, it advances the process to step S212; otherwise, it invalidates the state of the target certificate (S216), thus ending the process. Assume that the information of the reliable publisher (server) is registered in advance in the document management server 1003. In the following description, a certificate server 1009 (see FIG. 1) will be explained as a reliable server unless otherwise specified. Also, the publisher of the certificate will be explained as the certificate server 1009 unless otherwise specified.

The document registration apparatus 1001 then acquires expiration date information described in the target certificate, and checks if the target certificate has expired (S212). If the target certificate has not expired yet, the document registration apparatus 1001 advances the process to step S213; otherwise, it invalidates the state of the target certificate (S216), thus ending the process.

The document registration apparatus 1001 acquires a certificate revocation list (CRL) as a list of revoked electronic certificates from the certificate server 1009 as the publisher of the target certificate (S213). The document registration apparatus 1001 checks if the target certificate is included in the CRL (S214). If the target certificate is not included in the CRL, the document registration apparatus 1001 validates the state of the target certificate (S215); otherwise, since the target certificate has been revoked, it invalidates the state of the target certificate (S216), thus ending the process.

Electronic Signature Adding Process

Figure 6B:
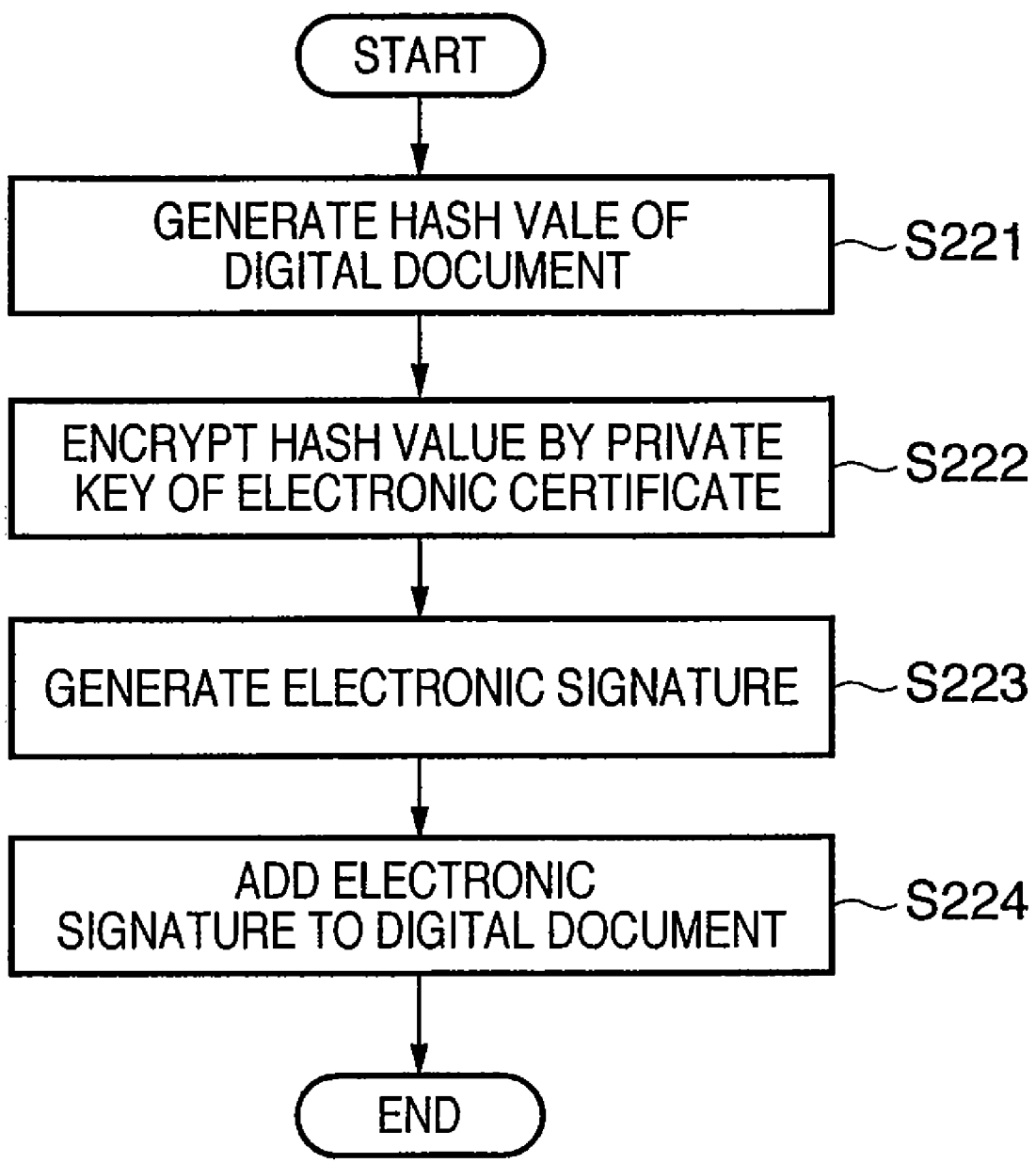
FIG. 6B is a flowchart for explaining an electronic signature adding process.

FIG. 6B is a flowchart for explaining the electronic signature adding process (step S203 in FIG. 5).

The document registration apparatus 1001 calculates a Hash value for a digital document (S221). Note that the calculation of the Hash value can use Hash functions such as MD5, SHA-1, and the like. If an electronic signature has already been added to the digital document, a Hash value is calculated taking that electronic signature into consideration as well.

FIGS. 7A to 7C show the relationships between an original digital document and Hash value calculation target.

A digital document in FIG. 7A includes only an original document. In other words, an electronic signature is not added. When an electronic signature is to be added to this digital document, the original document alone is a Hash value calculation target. Upon adding an electronic signature to this digital document, a digital document shown in FIG. 7B is generated. The digital document in FIG. 7B includes the original document and electronic signature (signature 1).

Upon adding another electronic signature to the digital document shown in FIG. 7B, both the original document and signature 1 are Hash value calculation targets. Upon adding another electronic signature to this digital document, a digital document shown in FIG. 7C is generated. The digital document in FIG. 7C includes the original document, electronic signature (signature 1), and electronic signature (signature 2).

The document registration apparatus 1001 encrypts the Hash value calculated in step S221 using the private key included in the target certificate (S222), and generates an electronic signature including the encrypted Hash value and target certificate (S223). The document registration apparatus 1001 appends the generated electronic signature to the digital document (S224). As the formats of this electronic signature, for example, PKC#7, PDF electronic signature, and the like are available. Note that the document registration apparatus 1001 may generate an electronic signature which includes information indicating that the digital document will be registered in the document management server 1003, and a generation time of the electronic signature.

Digital Timestamp Adding Process

Figure 6C:
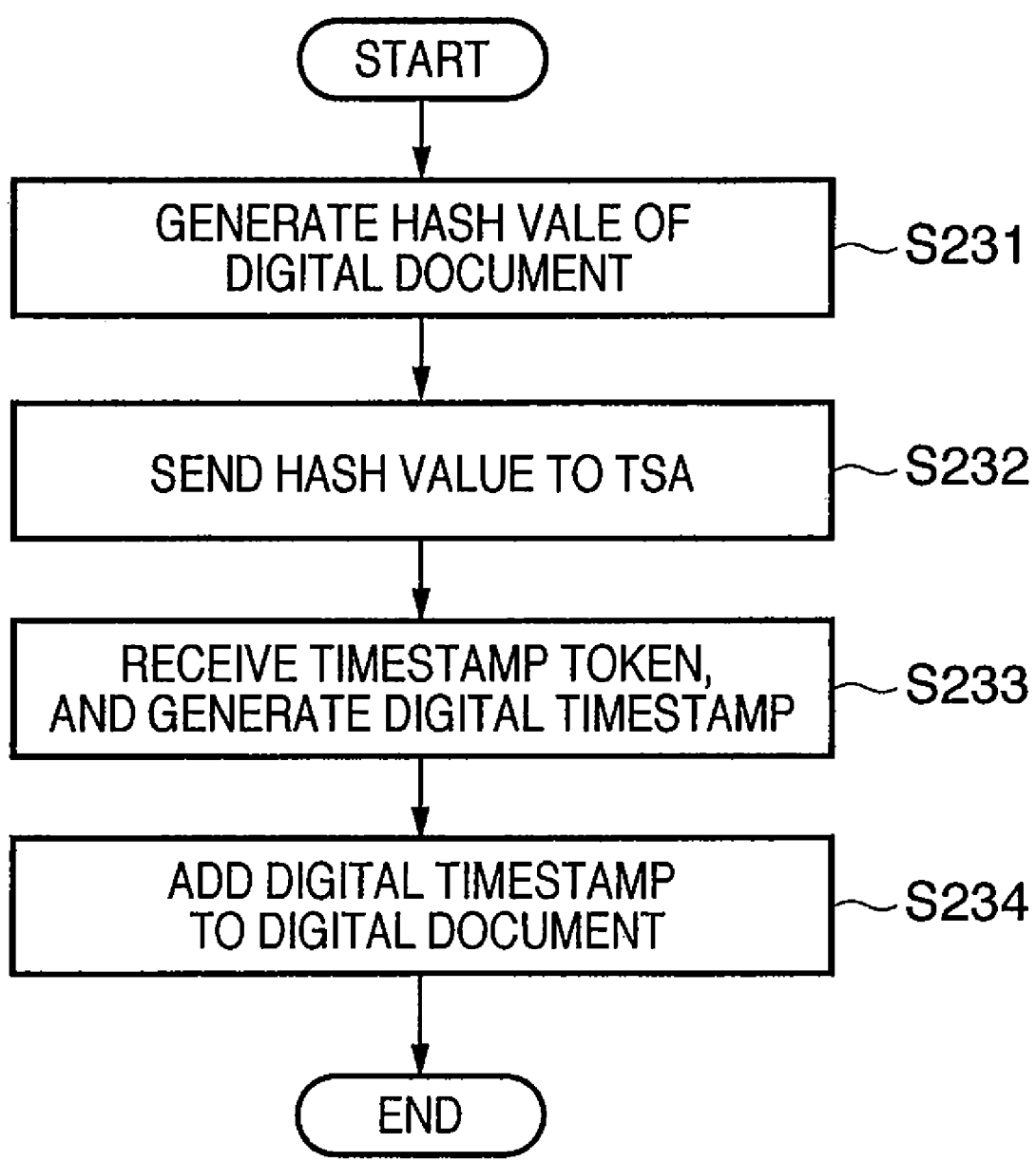
FIG. 6C is a flowchart for explaining a digital timestamp adding process.

FIG. 6C is a flowchart for explaining the digital timestamp adding process (step S204 in FIG. 5).

The document registration apparatus 1001 calculates a Hash value for the digital document to which the electronic signature is added in step S203 (S231). Note that the Hash value calculation target is an original document and one or a plurality of added electronic signatures as in the electronic signature adding process.

Next, the document registration apparatus 1001 sends the calculated Hash value to a timestamp server 1008 (time stamping authority (TSA); see FIG. 1) (S232).

Upon reception of the Hash value, the timestamp server 1008 encrypts the received Hash value using a private key unique to the timestamp server 1008, and generates combined information that combines the encrypted Hash value and the current time. The timestamp server 1008 generates a timestamp token including this combined information, and an electronic certificate having a public key corresponding to the private key, and returns the time stamp token to the document registration apparatus 1001.

Upon reception of the timestamp token from the timestamp server 1008, the document registration apparatus 1001 generates a digital timestamp including the received timestamp token and other kinds of required information (S233). Note that in step S233 the document registration apparatus 1001 acquires a CRL of the certificate of the immediately preceding signature from the certificate server 1009 as needed (that is, when the user selects signature adding in the long-term signature format in step S110). Then, the document registration apparatus 1001 sets the acquired CRL of the certificate of the immediately preceding signature in the digital timestamp.

The document registration apparatus 1001 appends the generated digital timestamp to the digital document added with the electronic signature (S234).

[Verification of Digital Document]

Figure 8:
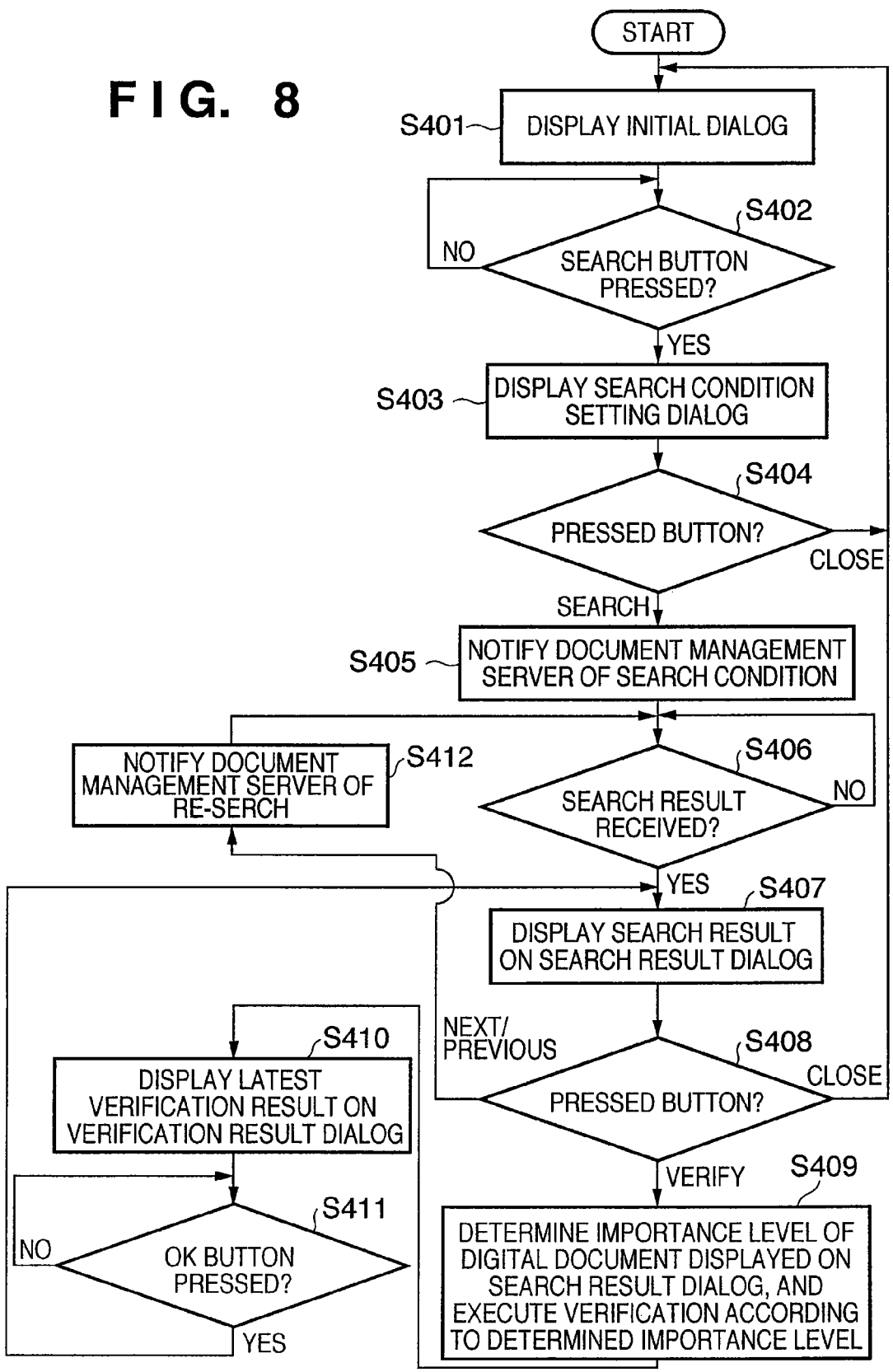
FIG. 8 is a flowchart for explaining a verification process to be executed by a document verification apparatus of a digital document registered in the document management server.

FIG. 8 is a flowchart for explaining the verification process (that by the document verification apparatus 1002) of digital documents registered in the document management server 1003.

Figure 9A:
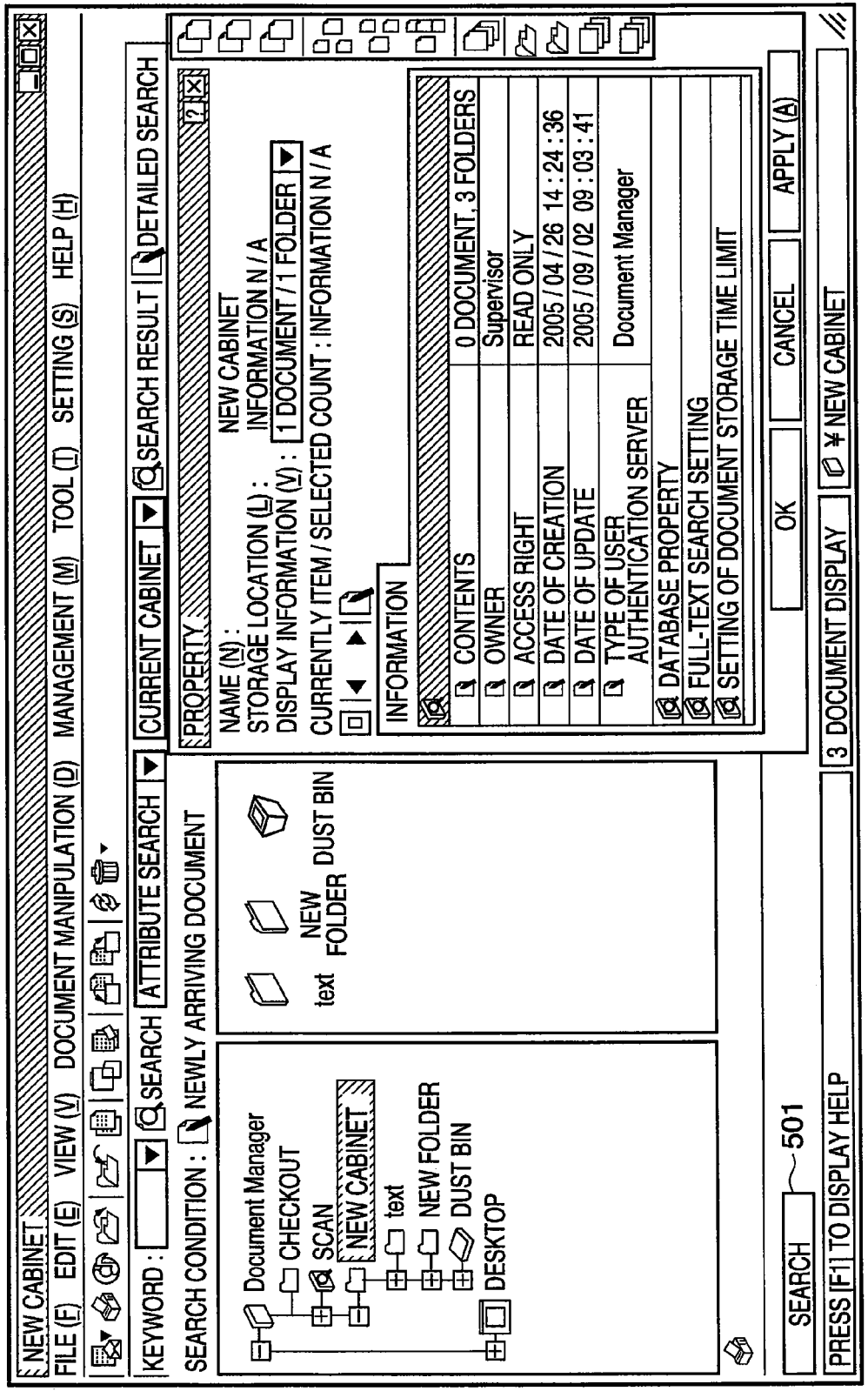
FIG. 9A shows an example of an initial dialog in the verification process of a digital document.

The document verification apparatus 1002 displays an initial dialog shown in FIG. 9A on a monitor (not shown) (S401). The initial dialog is used to display the file names of digital documents registered in the document management server 1003. If the user presses a "search" button 501 on the initial dialog (S402), the document verification apparatus 1002 displays a search condition setting dialog shown in FIG. 4B (S403). The search condition setting dialog allows the user to set search conditions required to search digital documents registered in the document management server 1003 for a desired digital document.

If the user presses a "close" button 503 on the search condition setting dialog (S404), the document verification apparatus 1002 returns the process to step S401. If the user sets the search conditions on the search condition setting dialog and then presses a "search" button 502 (S404), the document verification apparatus 1002 notifies the document management server 1003 of the set search conditions (including the number of hits designated in advance by the user) (S405).

Upon reception of the search conditions, the document management server 1003 searches digital documents registered in itself according to the search conditions, and returns a search result to the document verification apparatus 1002.

Upon reception of the search result (S406), the document verification apparatus 1002 displays a search result dialog shown in FIG. 9C, and displays the received search result (S407). The search result dialog displays the file names of digital documents as many as the number of documents designated in advance by the user. If the user presses a "next" or "previous" button 506 on the search result dialog (S408), the document verification apparatus 1002 notifies the document management server 1003 of a re-search (S412). Then, the document verification apparatus 1002 returns the process to step S406 so as to display the re-search result under the same search conditions on the search result dialog. In response to this notification, the document management server 1003 returns the file names of digital documents as many as the next or previous designated number of documents to the document verification apparatus 1002.

Figure 9D:
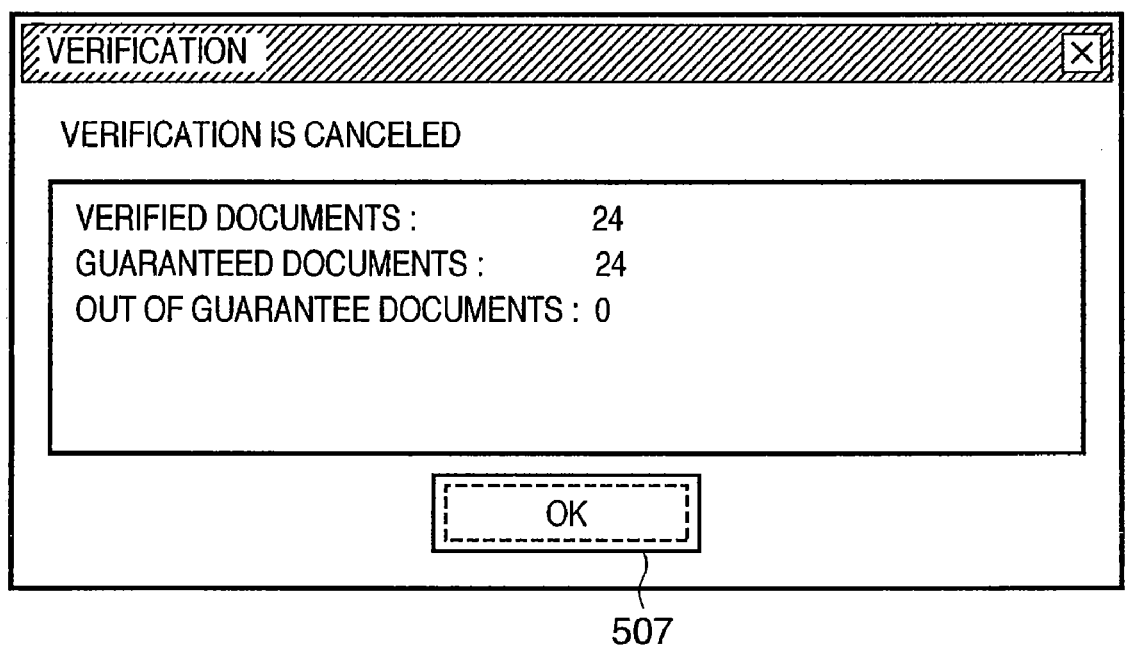
FIG. 9D shows an example of a verification result dialog in the verification process of a digital document.

On the other hand, if the user presses a "verify" button 504 on the search result dialog (S408), the document verification apparatus 1002 determines the importance levels of one or a plurality of digital documents displayed on the search result dialog and executes verification according to the determined importance levels (S409). Then, the document verification apparatus 1002 displays latest verification results on a verification result dialog shown in FIG. 9D (S410). Note that determination of the importance levels and verification according to the importance levels will be described later.

If the user presses an "OK" button 507 on the verification result dialog (S411), the document verification apparatus 1002 returns the process to step S407. In this case, the document verification apparatus 1002 displays new verification results of respective digital documents on respective columns of the search result dialog.

If the user presses a "close" button 505 on the search result dialog (S408), the document verification apparatus 1002 returns the process to step S401.

Determination of Importance Level and Verification According to Importance Level The document verification apparatus 1002 sets a digital document to be verified (to be referred to as a "target digital document" hereinafter) and determines the importance level of the target digital document.

Figure 2A:
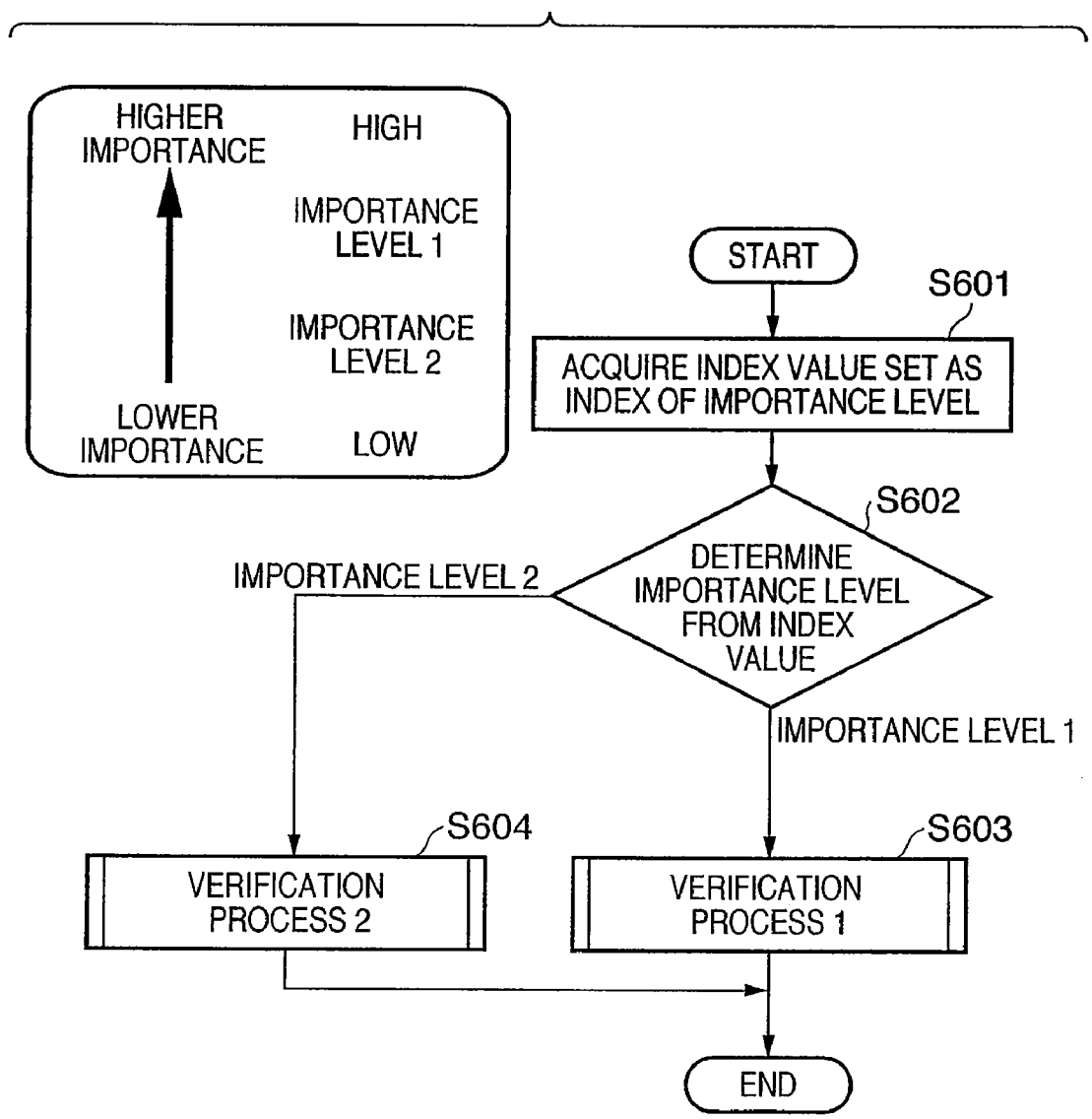
FIG. 2A is a flowchart showing importance determination and verification processes of digital documents.

FIG. 2A is a flowchart showing the importance determination and verification processes (S409) of a digital document.

The document verification apparatus 1002 specifies an index designated by the user in step S110 in FIGS. 3A and 3B as that of an importance level, and acquires the index value associated with the target digital document from the document management server 1003 (S601).

The document verification apparatus 1002 compares the acquired index value with the definitions of importance levels to determine an importance level (S602). As a result of determination, if the document verification apparatus 1002 determines that the importance level of the target digital document is high (importance level=1), it executes verification process 1 (S603). If the document verification apparatus 1002 determines that the importance level of the target digital document is low (importance level=2), it executes verification process 2 (S604). Note that details of verification processes 1 and 2 will be described later.

The importance level may be determined in step S602 based on the adding format of an electronic signature (long-term signature format or not) in place of the index value. That is, the document verification apparatus 1002 determines that a digital document added with an electronic signature in the long-term signature format has a high importance level, and executes verification process 1. On the other hand, the document verification apparatus 1002 determines that a digital document added with an electronic signature in the normal format has a low importance level, and executes verification process 2.

Figure 2B:
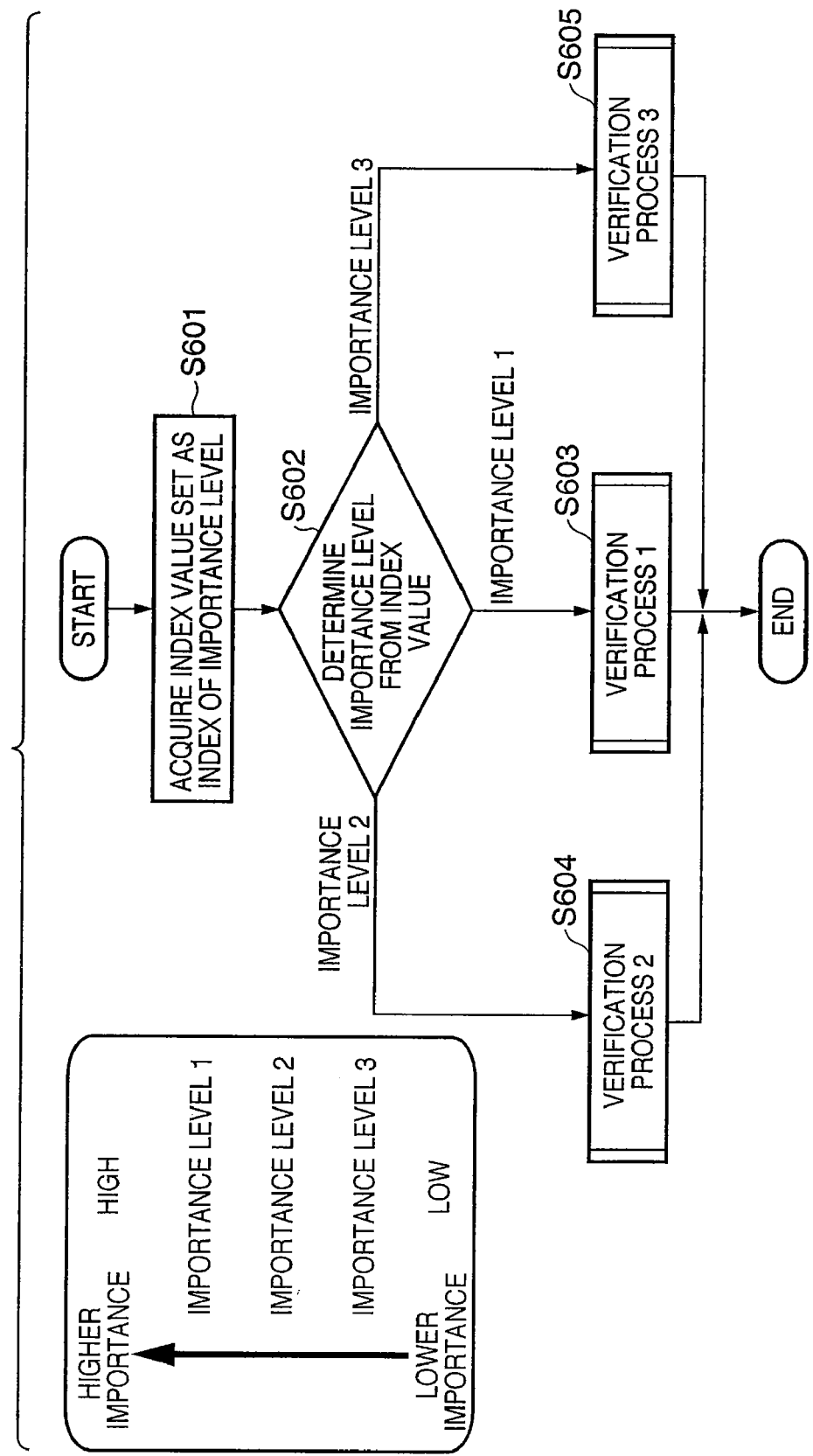
FIG. 2B is a flowchart showing another example of importance determination and verification processes of digital documents.

FIG. 2B is a flowchart showing another example of the importance determination and verification processes (S409) of a digital document.

As shown in FIG. 2B, the document verification apparatus 1002 may define three importance levels. If the document verification apparatus 1002 determines that the importance level is middle (importance level=2), it may execute verification process 2 (S604). If the document verification apparatus 1002 determines that the importance level is low (importance level=3), it may execute verification process 3 (S605). In case of verification process 3, the document verification apparatus 1002 acquires and displays the previous verification result saved in the document management server 1003.

Figure 2C:
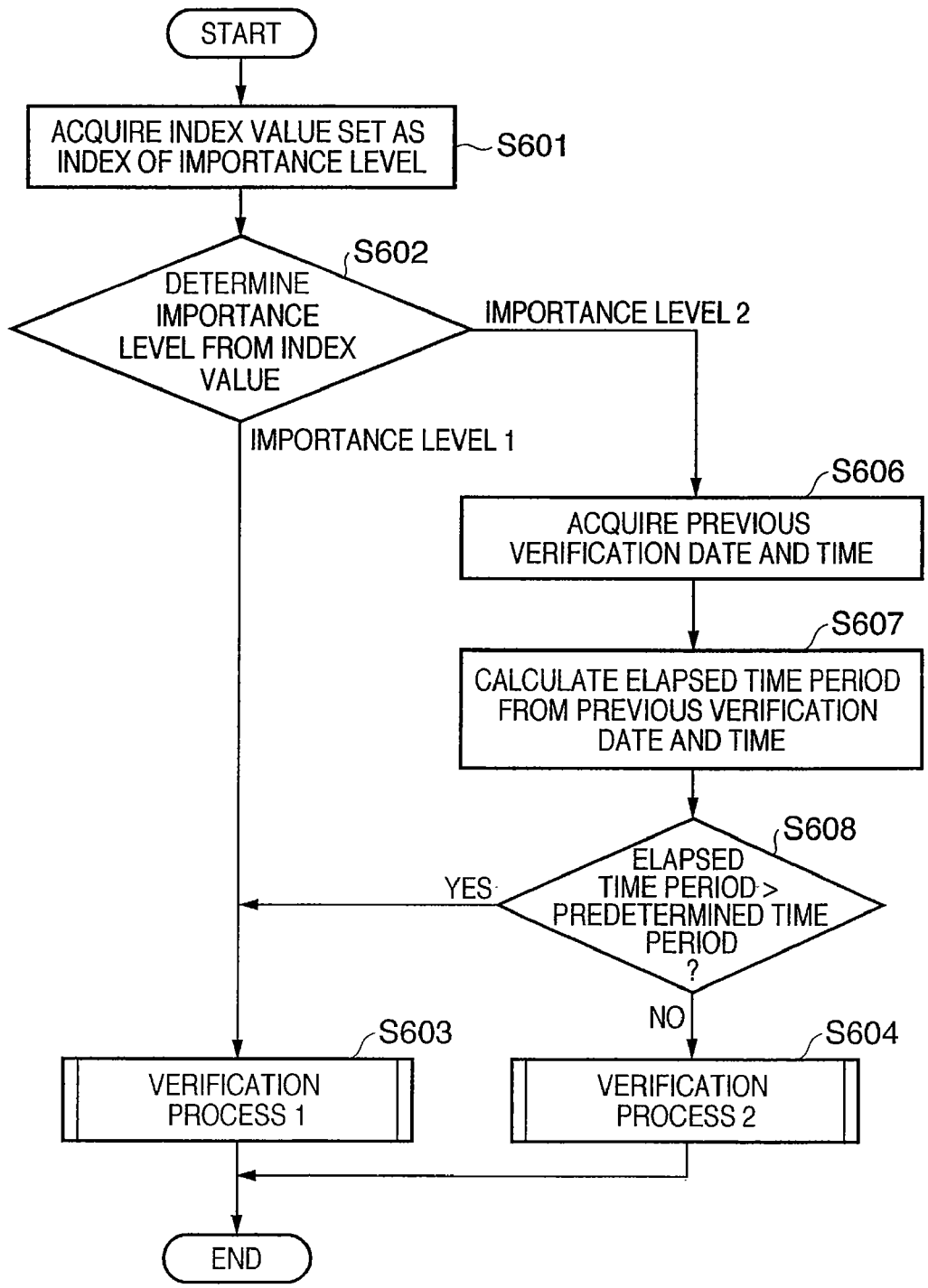
FIG. 2C is a flowchart showing still another example of importance determination and verification processes of digital documents.

FIG. 2C is a flowchart showing still another example of the importance determination and verification processes (S409) of a digital document.

The importance determination in step S602 is not limited to the use of an index value. If the document verification apparatus 1002 determines that the digital document has an importance level=2 (or importance level=3), it acquires the previous verification date and time from the document management server 1003 (S606). The document verification apparatus 1002 calculates a time period elapsed from the previous verification date and time (S607) and checks if the elapsed time period has exceeded a predetermined time period which is set in advance by the user (or system) (S608). If the elapsed time period>predetermined time period, the document verification apparatus 1002 determines an importance level higher by one level, and executes verification process 1 (S603) (or verification process 2 (S604)).

In the above description, the importance determination may be made based on the adding format of a signature in step S602 in FIG. 2A. The reason why the importance determination is made based on the adding format of a signature and what is the adding format of a signature will be explained below.

The user selects the normal format upon adding a signature to a document with a relatively low importance level. On the other hand, the user may select the long-term signature format (e.g., XAdES®) upon adding a signature to a document with a relatively high importance level.

After a digital timestamp is added at a given time to a document to which a signature is added in the normal format, a digital timestamp is added at the next time (a time after the given time) in response to a user's request or by an automatic process of the document management server 1003.

However, upon adding the next digital timestamp, since there is no certification indicating that the digital timestamp at the given time was invalid, adding of a signature in the normal format is not suited to a very important document.

On the other hand, after a digital timestamp is added at a given time to a document to which a signature is added in the long-term signature format, a CRL is acquired at the next time (a time after the given time) in response to a user's request or by an automatic process of the document management server 1003. A digital timestamp is added to the document after the acquired CRL is added.

That is, as a characteristic feature upon adding a signature in the long-term signature format, the CRL is added to the document immediately before the next digital timestamp is added. In this way, since the CRL is added to the document immediately before the next digital timestamp is added, it can be certified later that the (previous) digital timestamp at the given time was valid when the next digital timestamp was added.

Figure 15:
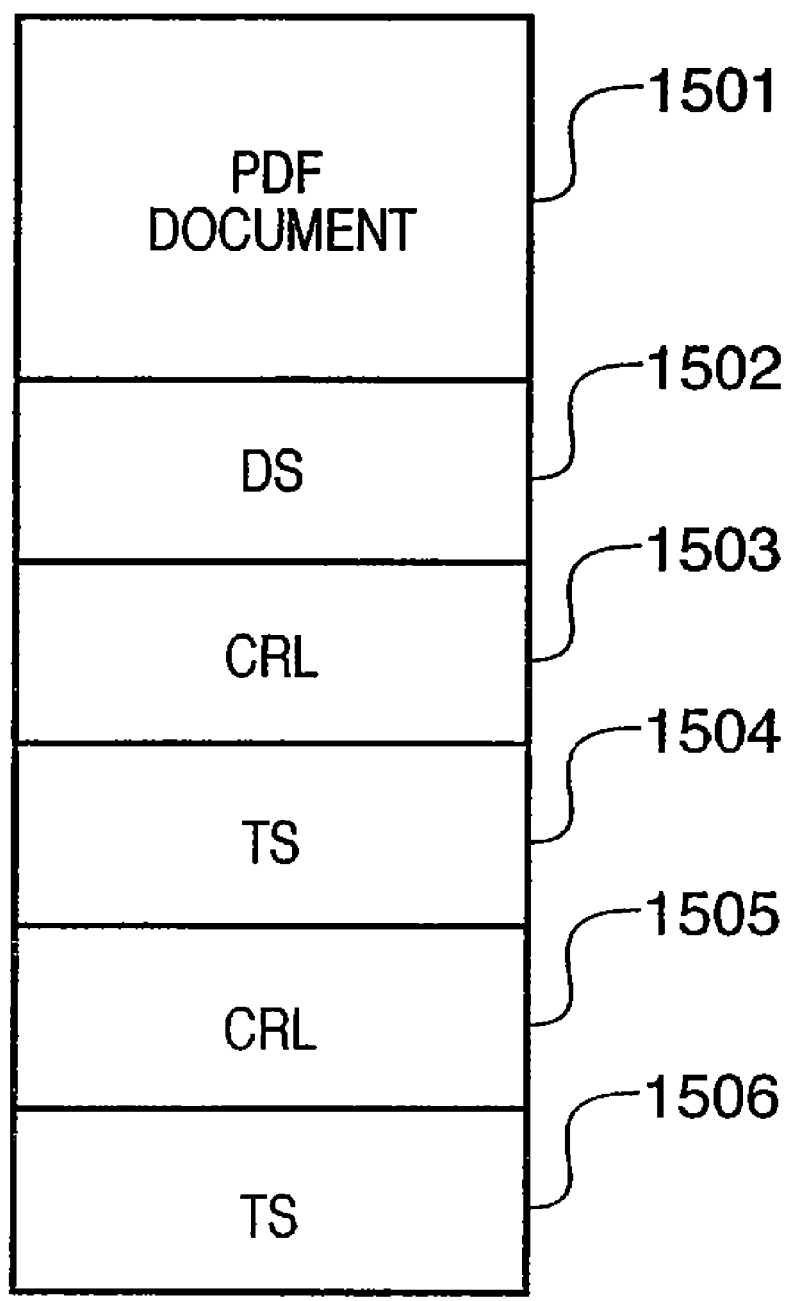
FIG. 15 shows the document structure when a signature is added to a document in a long-term signature format.

For example, when a signature is added to the document in the long-term signature format, a structure shown in FIG. 15 is obtained. An electronic signature (DS) 1502 is added to an original document 1501. In this structure, before the expiration date of a certificate used in the DS 1502, a CRL 1503 as a list of revoked certificates at that time is added, and a digital timestamp (TS) 1504 is added for the purpose of guaranteeing the adding time. As a result, even after the expiration date of the certificate used in the DS 1502, the CRL 1503 allows verification to the effect that the electronic signature was valid at the time of adding the TS 1504. Also, upon execution of an extension process, a CRL 1505 of the TS 1504 added immediately before a timestamp 1506 for extension is added before the timestamp 1506 is added. In this way, by adding the CRL of the previously added signature immediately before the next signature, the validity of the previously added signature can be verified later.

As described above, by adding a signature in the long-term signature format, a certification indicating that the digital timestamp at the given time was invalid at the time of adding the next digital timestamp can be included. For these reasons, adding of a signature in the long-term signature format is suited to a very important document.

Verification Process

Figure 10A:
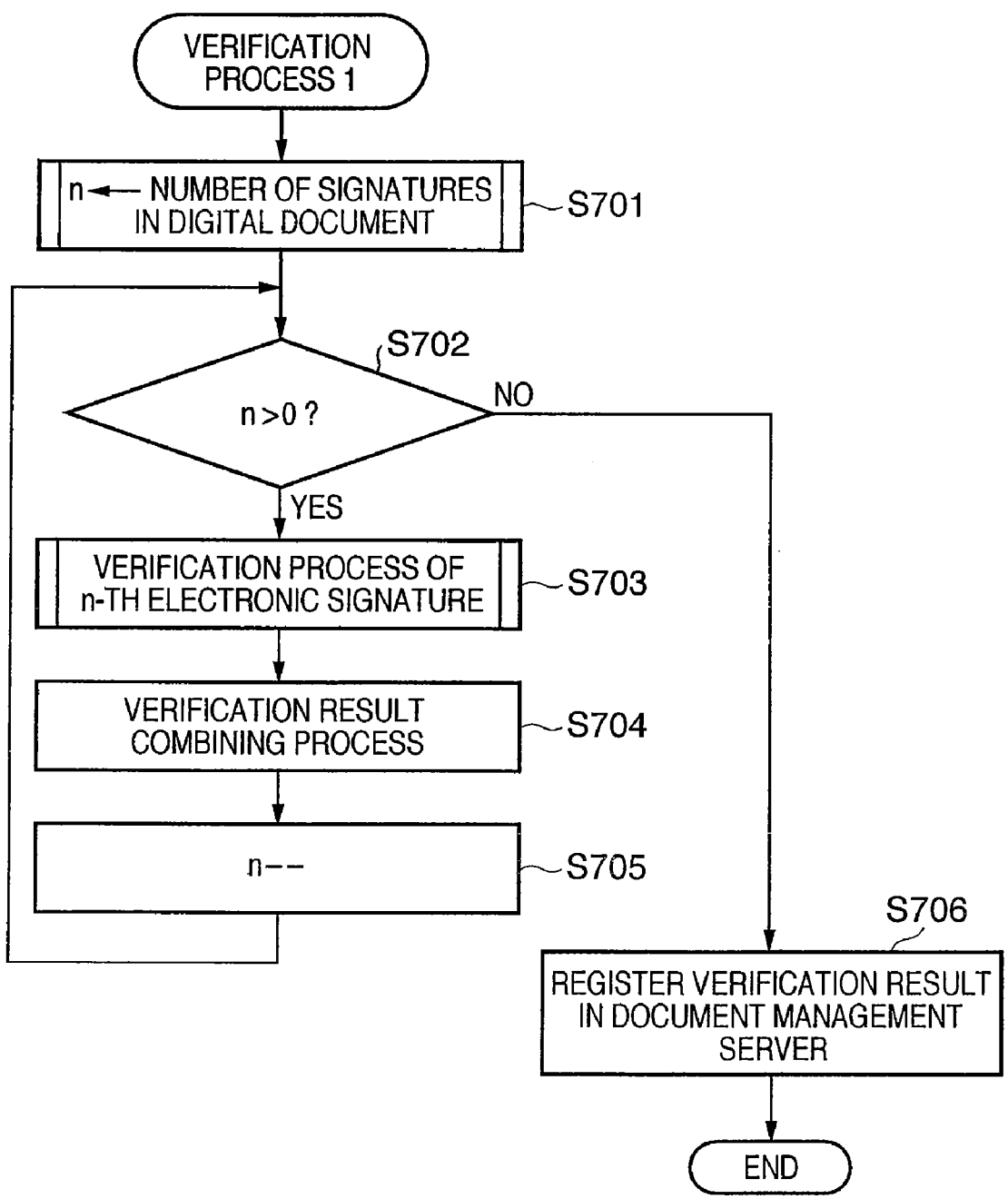
FIG. 10A is a flowchart showing details of verification process 1.

FIG. 10A is a flowchart showing details of verification process 1 (S603).

The document verification apparatus 1002 determines the validity of the target digital document based on the "validity" of each electronic signature included in the target digital document.

Figure 11A:
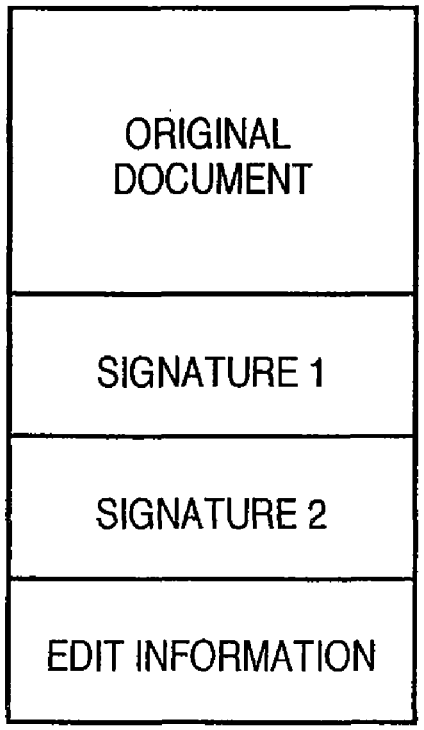
FIGS. 11A and 11B are views for explaining the relationship among an original document, electronic signatures, and edit information.

The document verification apparatus 1002 counts the number of electronic signatures included in the target digital document, and sets that number in a counter n (S701). Assume that serial numbers are given to the electronic signatures included in the target digital document in turn from the older ones. For example, numbers 1 and 2 are given to electronic signatures (signature 1 and signature 2) included in a digital document, as shown in FIG. 11A.

The document verification apparatus 1002 checks if n>0 (S702). If n=0 (there is no electronic signature to be verified), the document verification apparatus 1002 advances the process to step S706 to register the verification result in the document management server 1003.

If n>0 (there is an electronic signature to be verified), the document verification apparatus 1002 executes a verification process of the n-th electronic signature included in the target digital document (S703). Note that details of the verification process will be described later.

The document verification apparatus 1002 executes a process for obtaining the verification result of the target digital document (to be referred to as a "verification result combining process" hereinafter) based on the verification result of the n-th electronic signature (S704). Note that details of the verification result combining process will be described later. The verification result of the target digital document includes "valid" and "invalid". "Valid" indicates a digital document in which all electronic signatures are not altered and an electronic certificate is valid, and a digital document which is not edited after an electronic signature. Also, there are three types of "invalid" digital documents: a digital document in which an electronic signature has been altered, a digital document in which an electronic certificate is invalid, or a digital document which has been edited after an electronic signature is added.

The document verification apparatus 1002 decrements the counter n (S705) to return the process to step S702, and repeats the processes in steps S702 to S705 until all electronic signatures included in the target digital document are verified. Therefore, the verification result obtained in step S704 when n=1 becomes the final verification result of the target digital document.

The document verification apparatus 1002 stores the verification result and verification date and time in the document management server 1003 in association with the digital document registered in the document management server 1003 (S706). Note that the data structure to be managed by the document management server 1003 will be described later.

Figure 10B:
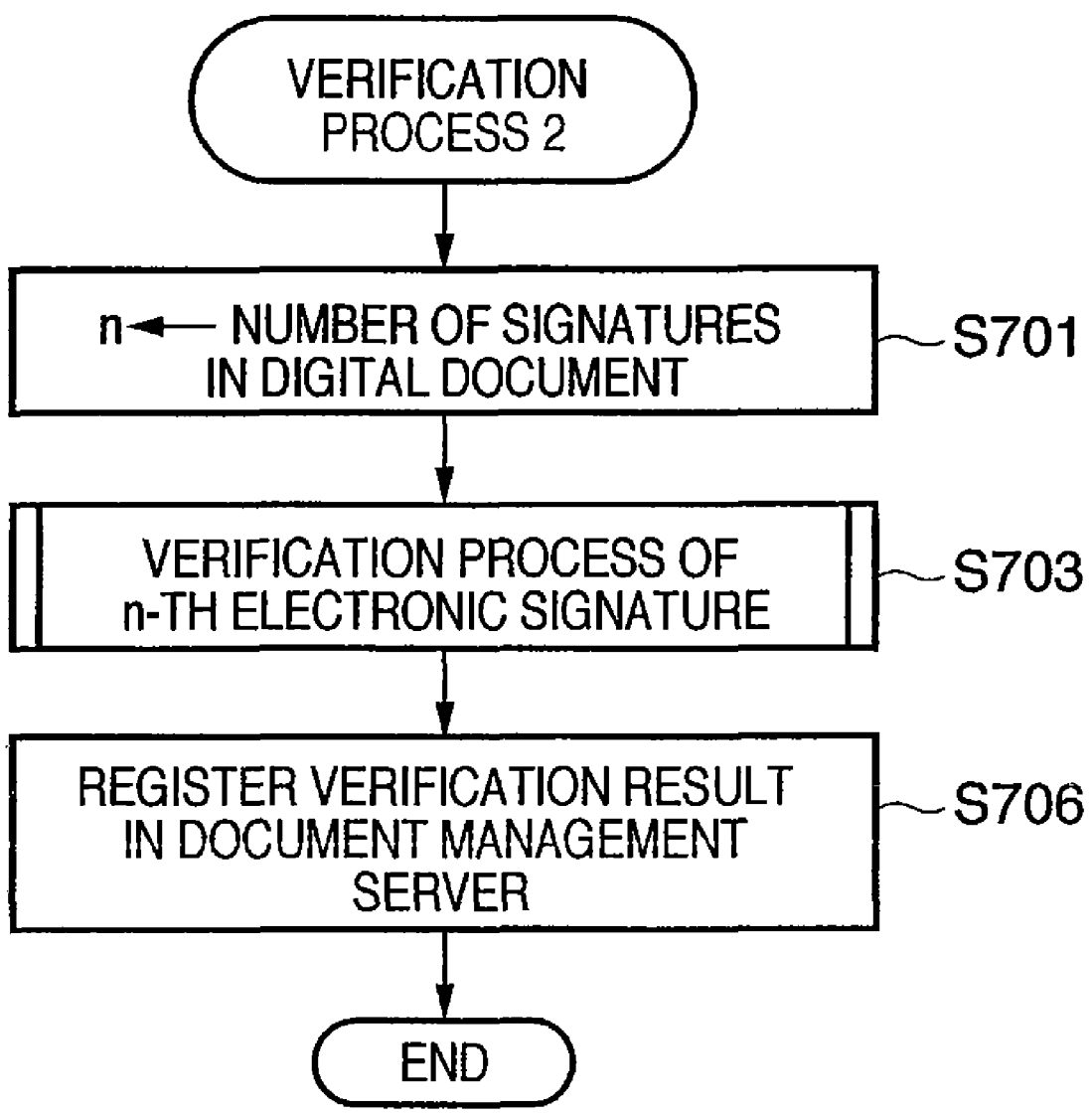
FIG. 10B is a flowchart showing details of verification process 2.

FIG. 10B is a flowchart showing details of verification process 2 (S604).

Unlike in verification process 1 shown in FIG. 10A, the latest electronic signature alone is verified (S703), and that verification result is determined as the final verification result of the digital document to be verified (S706). In other words, old electronic signatures are not verified. In this manner, verification process 2 executes verification simpler than verification process 1.

The verification process of the n-th electronic signature will be explained below. Prior to this explanation, the terms "alteration" and "editing" will be defined.

"Alteration" is an act of illicitly changing a digital document including an electronic signature. For example, an act of opening a digital document including an electronic signature as data of the binary format, and changing binary data (to change a bit value from '1' to '0' or vice versa) is an alteration.

"Editing" is an act of changing a digital document including an electronic signature by a non-illicit method. For example, an act of opening a digital document (e.g., PDF format) including an electronic signature, changing an original document included in the PDF data, and adding information indicating change contents to the digital document is editing.

In other words, alteration is an act of changing a digital document, which results in loss of information before the alteration, while editing is an act of changing a digital document, which does not result in loss of information before the editing. Information indicating the change contents will be referred to as "edit information" hereinafter. For example, when an original document shown in FIG. 11A is edited, edit information indicating the change contents is added to the digital document, and an electronic signature (signature 3) is further added, thus generating a digital document shown in FIG. 11B.

FIG. 10C is a flowchart showing details of the verification process (S703) of the n-th electronic signature.

The document verification apparatus 1002 checks if the target digital document has been altered after the n-th electronic signature was added and before the (n+1)-th electronic signature was added (S711). If the n-th electronic signature is the latest electronic signature added to the target digital document, the document management server 1003 checks if the target digital document has been altered after the n-th (latest) electronic signature was added (S711).

If the n-th electronic signature is not a digital timestamp, the practical process in step S711 is as follows.

The document verification apparatus 1002 decodes a Hash value included in the n-th electronic signature using a public key of an electronic certificate included in the n-th electronic signature. Furthermore, the document verification apparatus 1002 calculates a Hash value from a digital document before the n-th electronic signature was added. The document verification apparatus 1002 compares the decoded and calculated Hash values. If the two Hash values are different, the document verification apparatus 1002 determines that the target digital document has been altered. If the two Hash values are equal to each other, the document verification apparatus 1002 determines that the target digital document is not altered.

If the electronic signature is a digital timestamp, the practical process in step S711 is as follows.

The document verification apparatus 1002 decodes a Hash value in a timestamp token included in the n-th digital timestamp using a public key included in the n-th digital timestamp. Furthermore, the document verification apparatus 1002 calculates a Hash value from a digital document before the n-th digital timestamp was added. The document verification apparatus 1002 compares the decoded and calculated Hash values. If the two Hash values are different, the document verification apparatus 1002 determines that the target digital document has been altered. If the two Hash values are equal to each other, the document verification apparatus 1002 determines that the target digital document is not altered.

The document verification apparatus 1002 then confirms the validity of an electronic certificate included in the n-th electronic signature (S712).

If the n-th electronic signature is not a digital timestamp, the practical process in step S712 is the same as the confirmation process for the validity of a certificate shown in FIG. 6A. However, the process in FIG. 6A is executed by the document registration apparatus 1001, but the process in step S712 is executed by the document verification apparatus 1002. In the process in FIG. 6A, if the electronic certificate has expired at the time of confirmation for the validity of the electronic certificate, the state of the electronic certificate is always invalidated. By contrast, even if the electronic certificate has expired at the time of confirmation for the validity of the electronic certificate, if a digital timestamp is added before the expiration date, the state of the electronic certificate is validated.

If the n-th electronic signature is a digital timestamp, the practical process in step S712 is as follows. The document verification apparatus 1002 checks based on the expiration date described in the timestamp token included in the digital timestamp if that digital timestamp is valid.

Figure 11B:
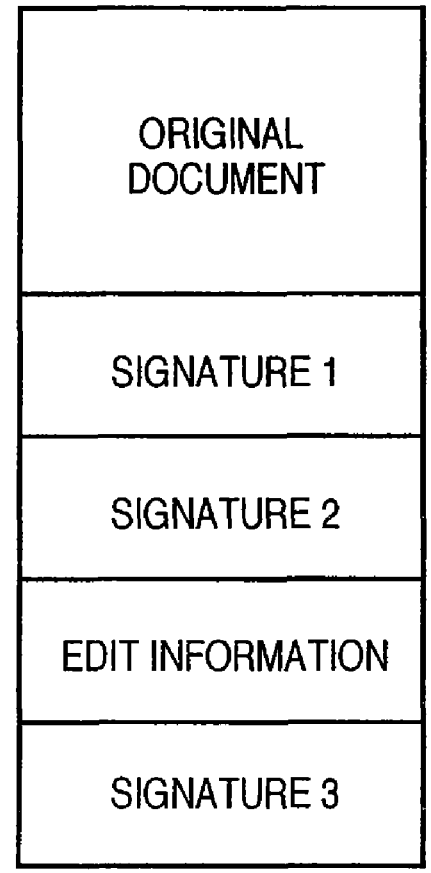

The document verification apparatus 1002 then checks if an original document has been edited after the n-th electronic signature (S713). For example, the document verification apparatus 1002 can make this determination by seeing if the edit information shown in, e.g., FIG. 11B is included in the target digital document.

Figure 10D:
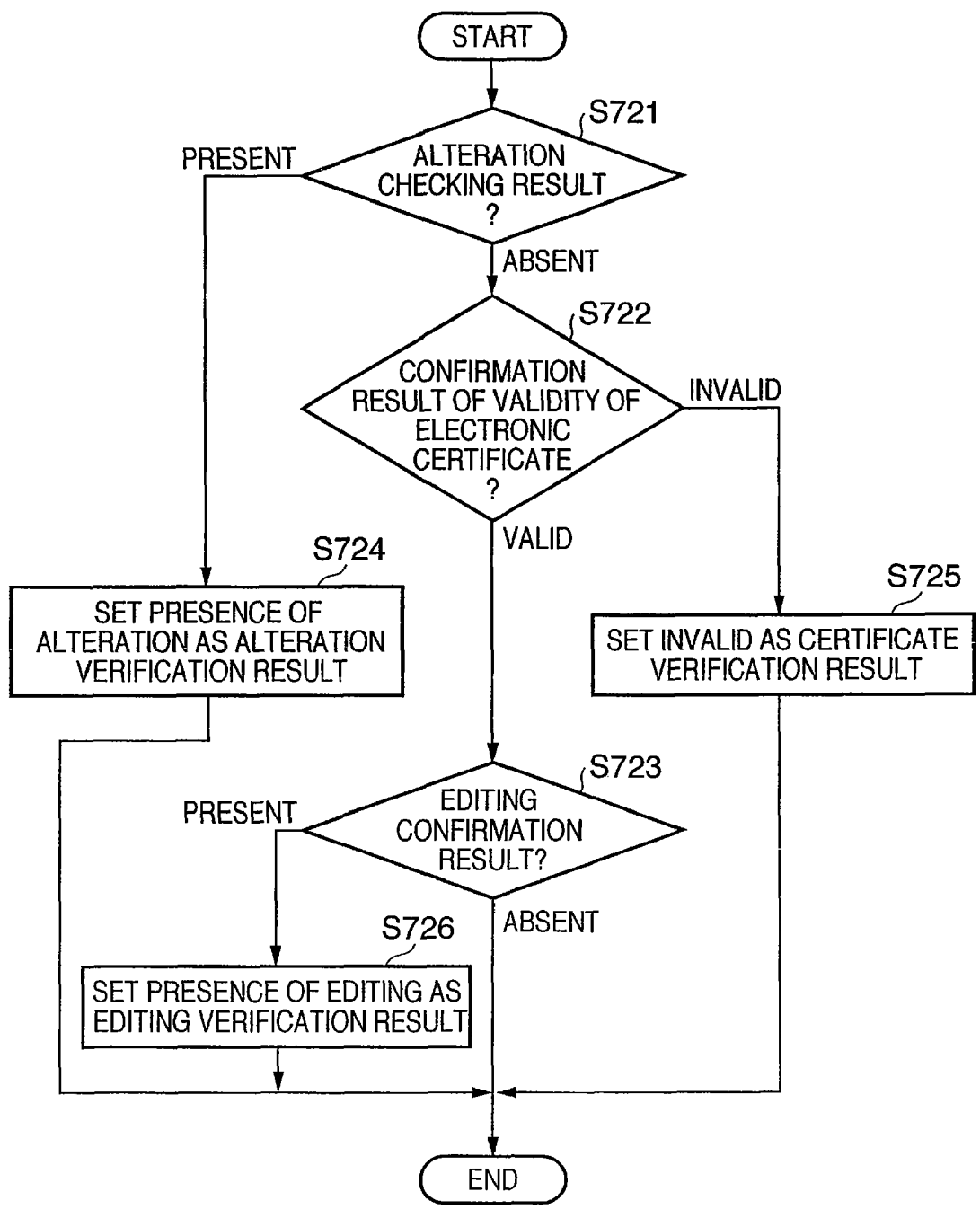
FIG. 10D is a flowchart showing a combining process of verification results.

FIG. 10D is a flowchart showing details of the verification result combining process (S704).

The document verification apparatus 1002 examines the alteration checking result in step S711 (S721). If the checking result indicates the presence of alteration, the document verification apparatus 1002 sets an alteration verification result as the presence of alteration (S724), thus ending the combining process.

If the alteration checking result indicates the absence of alteration, the document verification apparatus 1002 examines the validity confirmation result of the electronic certificate in step S712 (S722). If the confirmation result indicates "invalid", the document verification apparatus 1002 sets a certificate verification result as "invalid" (S725), thus ending the combining process.

If the validity confirmation result of the electronic certificate indicates "valid", the document verification apparatus 1002 examines the checking result as to whether or not the original document has been edited after the n-th electronic signature (S723). If the checking result indicates that the original document has been edited, the document verification apparatus 1002 sets an editing verification result as the presence of editing (S726), thus ending the combining process.

Assume that the document verification apparatus 1002 sets "the absence of alteration" in the alteration verification result, "valid" in the certificate verification result, and "the absence of editing" in the editing verification result before the beginning of the verification process.

[Display Window of Verification Result]

FIG. 12 shows details of the verification result dialog shown in FIG. 9C. This is also a dialog displayed by the document verification apparatus 1002 after the verification process.

A verification result display area 501 of the verification result dialog has at least the following areas.

A display area 502 displays the document names of respective digital documents.

An icon display area 503 displays the verification process results of the respective digital documents using the following icons: a check mark "✓" icon indicating that a digital document is valid; an exclamation mark "!" icon indicating a digital document is not altered but suffers a problem other than alteration; an inverted exclamation mark "¡" icon indicating that a digital document has been altered; a question mark "?" icon indicating that a digital document is not verified yet; and so forth.

The check mark "✓" icon is displayed for a digital document which is determined in verification process 1 in FIG. 10A to be valid. The exclamation mark "!" icon is displayed for a digital document which is determined in verification process 1 in FIG. 10A to have an invalid electric certificate or to have been edited. The inverted exclamation mark "¡" icon is displayed for a digital document which is determined in verification process 1 in FIG. 10A to have been altered. The question mark "?" icon is displayed for a digital document for which verification process 1 in FIG. 10A is not executed yet.

Even in case of the check mark "✓" icon, the display contents are partially different depending on the level of the executed verification process. For example, in case of the verification result of verification process 2, "✓ (simple verification)" is displayed. In case of the verification result of verification process 3, "✓ (log verification)" is displayed.

A display area 504 displays the verification result contents. The verification result contents are displayed based on the alteration verification result, certificate verification result, and editing verification result obtained in FIG. 10C.

In case of the verification result indicating non alteration of a document, the level of the executed verification process is displayed together, indicating the verification process which produced the result "non alteration".

A display area 505 displays the adding dates and times of digital timestamps, i.e., the last adding dates and times of digital timestamps.

A display area 506 displays the latest dates and times of verification dates and times of digital documents.

[Data Structure Example]

FIGS. 13A to 13D show an example of the data structure managed by the document management server 1003.

A document table shown in FIG. 13A has a document ID column and document name column which are managed by the document management server 1003 to uniquely specify digital documents, a verification result column indicating the previous verification results of digital documents, and a verification date and time-column indicating the previous verification dates and times of digital documents.

An index table shown in FIG. 13B has an index ID column and index name column which are managed by the document management server 1003 to uniquely specify indices, and a type column indicating the data types of indices.

A character string type index value table shown in FIG. 13C has a document ID column indicating digital documents, an index ID column indicating indices, and a value column indicating character strings registered as index values in digital documents.

An integer type index value table shown in FIG. 13D has a document ID column indicating digital documents, an index ID column indicating indices, and a value column indicating integer values registered as index values in digital documents.

[Setting of Importance Level]

Figure 14B:
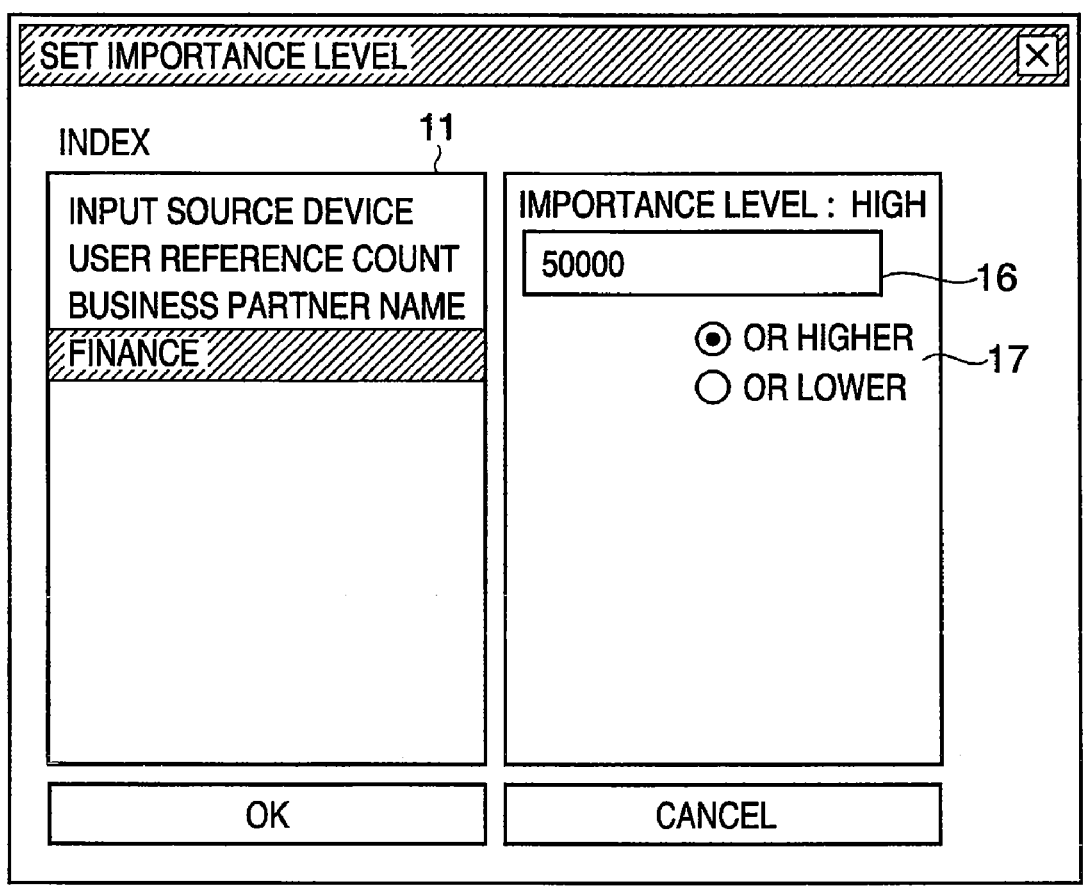

FIGS. 14A and 14B show an example of a user interface (UI) used to set an importance level. That is, the document registration apparatus 1001 displays this UI when the user inputs index information to be added to a digital document using the preview dialog shown in FIG. 4D (S110 in FIGS. 3A and 3B).

A list box 11 on the dialog shown in FIG. 14A or 14B displays a list of index names. The user designates an index used to set an importance level. The contents of a pane on the right side change depending on the index designated by the user.

When the user selects a character string type index, the right pane displays list boxes 12 and 13 that display the values of the designated character string type index, as shown in FIG. 14A. The user selects one of values listed on the list box 12 or 13, and presses an arrow "↑" button 15 or arrow "↓" button 14 to move the selected value between the list box 12 with a high importance level and the list box 13 with a low importance level. A digital document having index values that matches character strings listed on the list box 12 is determined to have a high importance level. A digital document having index values that matches character strings listed on the list box 13 is determined to have a low importance level.

FIG. 14A shows an example in which the user selects "business partner name" as a character string type index as an index to set that a digital document including at least one of "AA trade corporation" and "BB corporation" is determined as that with a high importance level. A digital document including "CC industries" listed on the list box 13 is determined to have a low importance level. Furthermore, since the list box 13 includes "others", a digital document having "business partner name" other than "AA trade corporation", "BB corporation", and "CC industries" is determined to have a low importance level.

On the other hand, when the user selects an integer type index, the right pane displays a text box 16 which allows the user to input a threshold of an importance level, as shown in FIG. 14B. The user inputs an integer value to the text box 16 and manipulates radio buttons 17 to indicate if an index value is equal to or higher or lower than that value.

In the example of FIG. 14B, the user selects "amount" and sets 50000 or higher as a threshold of an importance level. Therefore, a digital document having a value equal to or higher than 50000 as an amount is determined to have a high importance level. A digital document having a value less than 50000 as an amount is determined to have a low importance level.

In the above description, the character string type index and integer type index have been exemplified as an index of an importance level. Alternatively, a date type index may be used to switch an importance level before and after a predetermined date and time.

Upon managing digital documents using a specific format (standard format or the like), a UI that allows the user to designate a specific region of a digital document in place of an index value is prepared. Then, data used to determine an importance level may be acquired from the designated specific region in place of the index value to determine an importance level. In case of a scan image, optical character recognition (OCR) may be executed to extract a character string or numerical value from the designated specific region.

As described above, upon execution of batch verification of a plurality of digital documents, an importance level is determined, and a verification method can be switched in accordance with the importance level. Therefore, the verification time for digital documents with lower importance levels is saved, and prompt verification (verification at the present moment) of important digital documents is allowed, thus shortening the time required for batch verification.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-275728, filed Oct. 6, 2006, which is hereby incorporated by reference herein in its entirety.

What is claimed is:

1. An information processing apparatus for verifying whether alteration or editing of a digital document is conducted, where the digital document has a plurality of importance levels and where verification signature is added to the digital document for verifying the digital document, such that, the present digital document contains original content of the document, data regarding each of the previously conducted editing and all the verification signatures corresponding to previous editing, comprising:
   an alteration determining unit configured to, using a public key of a certificate included in a verification signature, decode the hash value included in the verification signature to compare the decoded hash value with a hash value calculated from a digital document before adding the verification signature, and to determine that alteration is conducted when the decoded and calculated hash values are different, and that alteration is not conducted when the decoded and calculated hash values are identical;
   an editing determining unit configured to determine whether updated contents are saved after the verification signature or not;
   a validity determination unit configured to determine whether the verification signature is valid or not, wherein in a case that the verification signature is an electronic signature, if a certificate contained in the electronic signature is not expired, or a time stamp signature is conducted before expiration the certificate, which is determined that the electronic signature is valid, and in a case that the verification signature is a time stamp signature, if the expiration time of the time stamp signature is not passed, which is determined that the time stamp signature is valid; and
   a displaying unit configured to display verification results of digital documents in response to a user instruction, wherein a verification result of a previous verification of the digital document is displayed when the digital document has a low importance level, a verification result of a latest verification that verifies a newest verification signature contained in the digital document is displayed when the digital document has a middle importance level, and a combined verification result that verifies all verification signatures contained in the digital document when the digital document has a high importance level,
   wherein the combined verification result indicating the alteration is generated if at least one of results of the verification indicates an alteration, and
   wherein the combined verification result indicating a condition except for the alteration if all results of the verifications do not indicate the alteration, and at least one of the results indicates the editing or invalidation of the certificate.

2. An information processing method of information processing apparatus for verifying whether alteration or editing of a digital document is conducted, where the digital document has a plurality of importance levels and where verification signature is added to the digital document for verifying the digital document, such that, the present digital document contains original content of the document, data regarding each of the previously conducted editing and all the verification signatures corresponding to previous editing, comprising:
   a processor to perform the steps of:
      an alteration determining step, using a public key of a certificate included in a verification signature, for decoding the hash value included in the verification signature to compare the decoded hash value with a hash value calculated from a digital document before adding the verification signature, and for determining that alteration is conducted when the decoded and calculated hash values are different, and that alteration is not conducted when the decoded and calculated hash values are identical;
      an editing determining step for determining whether updated contents are saved after the verification signature or not;
      a validity determination step for determining whether the verification signature is valid or not, wherein in a case that the verification signature is an electronic signature, if a certificate contained in the electronic signature is not expired, or a time stamp signature is conducted before expiration the certificate, which determines that the electronic signature is valid, and in a case that the verification signature is a time stamp signature, if the expiration time of the time stamp signature is not passed, which determines that the time stamp signature is valid; and
      a displaying step for displaying verification results of digital documents in response to a user instruction, wherein a verification result of a previous verification of the digital document is displayed when the digital document has a low importance level, a verification result of a latest verification that verifies a newest verification signature contained in the digital document is displayed when the digital document has a middle importance level, and a combined verification result that verifies all verification signatures contained in the digital document when the digital document has a high importance level,
   wherein the combined verification result indicating the alteration is generated if at least one of results of the verification indicates an alteration, and
   wherein the combined verification result indicating a condition except for the alteration if all results of the verifications do not indicate the alteration, and at least one of the results indicates the editing or invalidation of the certificate.

* * * * *